United States Patent
Thangarasa et al.

(10) Patent No.: US 10,306,502 B2
(45) Date of Patent: May 28, 2019

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Santhan Thangarasa, Vällingby (SE); Christopher Callender, Kinross (GB); Muhammad Kazmi, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/577,070

(22) PCT Filed: May 3, 2016

(86) PCT No.: PCT/SE2016/050401
§ 371 (c)(1),
(2) Date: Nov. 27, 2017

(87) PCT Pub. No.: WO2016/190798
PCT Pub. Date: Dec. 1, 2016

(65) Prior Publication Data
US 2018/0176810 A1 Jun. 21, 2018

Related U.S. Application Data

(60) Provisional application No. 62/166,030, filed on May 25, 2015.

(51) Int. Cl.
*H04B 17/00* (2015.01)
*H04W 24/10* (2009.01)
(Continued)

(52) U.S. Cl.
CPC .......... *H04W 24/10* (2013.01); *H04L 5/001* (2013.01); *H04W 16/26* (2013.01); *H04W 76/11* (2018.02); *H04W 76/28* (2018.02); *H04W 24/00* (2013.01)

(58) Field of Classification Search
CPC ..... H04W 24/10; H04W 76/28; H04W 76/06; H04W 16/26; H04W 76/048; H04W 24/08; H04W 72/042
See application file for complete search history.

(56) References Cited

U.S. PATENT DOCUMENTS

| 9,801,232 B2* | 10/2017 | Deenoo | H04W 72/046 |
| 2012/0033595 A1* | 2/2012 | Aoyama | H04W 76/28 |
| | | | 370/311 |
| 2013/0223311 A1* | 8/2013 | Wang | H04L 5/0091 |
| | | | 370/311 |

* cited by examiner

*Primary Examiner* — Tuan Pham
(74) *Attorney, Agent, or Firm* — Baker Botts, L.L.P.

(57) ABSTRACT

Embodiments herein relate to a method performed by a radio network node (12) for configuring a wireless device (10), being served by the radio network node (12), for performing radio measurements. The radio network node (12) determines at least two groups, a first and a second group, of carriers out of a number of carriers, wherein the first group comprises at least one carrier to perform radio measurements on by the wireless device (10) when the wireless device (10) being configured with a DRX cycle above a threshold. The radio network node (12) furthermore transmits a message comprising an indication of the at least one carrier of the first group and informing the wireless device (10) which carrier or carriers to perform radio measurements on when the wireless device (10) is configured with the DRX cycle above the threshold.

16 Claims, 10 Drawing Sheets

(51) Int. Cl.
*H04L 5/00* (2006.01)
*H04W 76/28* (2018.01)
*H04W 76/11* (2018.01)
*H04W 16/26* (2009.01)
*H04W 24/00* (2009.01)

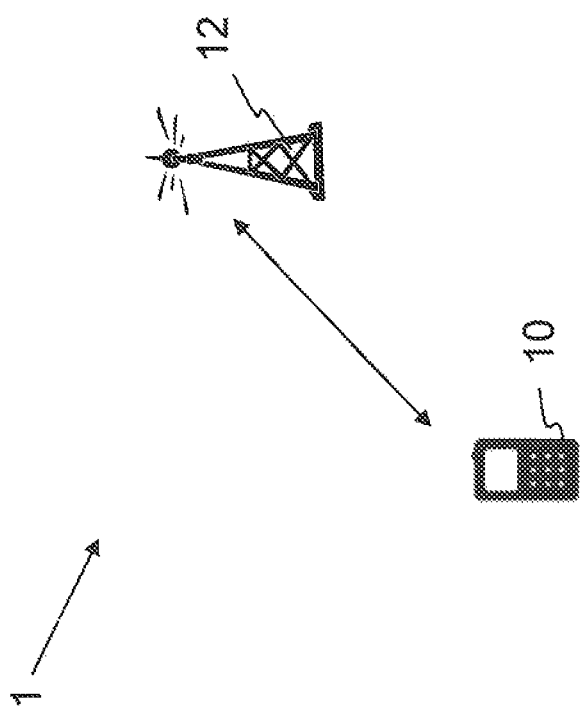

RADIO NETWORK NODE, WIRELESS DEVICE AND METHODS PERFORMED THEREIN

PRIORITY

This nonprovisional application is a U.S. National Stage Filing under 35 U.S.C. § 371 of International Patent Application Serial No. PCT/SE2016/050401 filed May 3, 2016, and entitled "Radio Network Node, Wireless Device And Methods Performed Therein" which claims priority to U.S. Provisional Patent Application No. 62/166,030 filed May 25, 2015, both of which are hereby incorporated by reference in their entirety.

TECHNICAL FIELD

Embodiments herein relate to a radio network node, a wireless device and methods performed therein. In particular, embodiments herein relate to enable a wireless device to perform radio measurements in a wireless communication network.

BACKGROUND

In a typical wireless communication network, wireless devices, also known as wireless communication devices, mobile stations and/or user equipments (UEs), communicate via a Radio Access Network (RAN) to one or more core networks. The RAN covers a geographical area which is divided into cell areas, with each cell area being served by a Base Station (BS), e.g., a radio base station (RBS), which in some networks may also be called, for example, a "NodeB" or "eNodeB". A cell is a geographical area where radio coverage is provided by the radio base station at a base station site or by an antenna at an antenna site in case the antenna and the radio base station are not collocated. Each cell is identified by an identity within the local radio area, which is broadcast in the cell. Another identity identifying the cell uniquely in the whole wireless communication network is also broadcasted in the cell. One base station may have one or more cells. The base stations communicate over the air interface operating on radio frequencies with the user equipments within range of the base stations in downlink (DL) to the user equipments and uplink (UL) from the user equipments.

A Universal Mobile Telecommunications System (UMTS) is a third generation wireless communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base stations connected directly to one or more core networks, i.e. they are not connected to RNCs.

A machine-to-machine (M2M) communication, aka machine type communication (MTC), is used for establishing communication between machines and between machines and humans. The M2M communication may comprise exchange of data, signaling, measurement data, configuration information etc. The size of a M2M device may vary from e.g. that of a wallet to that of a base station. The M2M devices are quite often used for applications like sensing environmental conditions e.g. temperature reading, metering or measurement e.g. electricity usage etc., fault finding or error detection etc. In these applications the M2M devices are active very seldom but over a consecutive duration depending upon the type of service e.g. about 200 ms once every 2 seconds, about 500 ms every 60 minutes etc. The M2M devices may also do measurement on other frequencies or other Radio access Technologies (RAT).

An M2M device may be a Low complexity UE, thus being an M2M device of low cost and low complexity. A low complexity UE that envisages for M2M operation may implement one or more low cost features like, smaller downlink and uplink maximum transport block size, e.g. 1000 bits, and/or reduced downlink channel bandwidth of 1.4 MHz for data channel, e.g. Physical Downlink Shared Channel (PDSCH). A low complexity UE may also comprise a Half-Duplex communication e.g. Half Duplex-Frequency Division Duplex (HD-FDD) and one or more of the following additional features: a single receiver at the UE, smaller downlink and/or uplink maximum transport block size e.g. 1000 bits, and a reduced downlink channel bandwidth of 1.4 MHz for data channel. The low complexity UE may also be termed as low cost UE.

The path loss between the M2M device and the base station can be very large in some scenarios such as when the M2M device is used as a sensor or metering device located in a remote location such as in the basement of a building. In such scenarios a reception of signal from base station is very challenging. For example the path loss can be worse than 20 dB compared to normal operation. In order to cope with such challenges the coverage in uplink and/or in downlink has to be substantially enhanced. This is realized by employing one or plurality of advanced techniques in the M2M device and/or in the base station for enhancing the coverage. Some non-limiting examples of such advanced techniques may be: transmit power boosting; repetition of transmitted signal; applying additional redundancy to the transmitted signal; use of advanced/enhanced receiver etc. In general when employing such coverage enhancing techniques the M2M communication is regarded to be operating in a coverage enhancing mode. A low complexity UE e.g. a UE with one single receiver (Rx) may also be capable of supporting enhanced coverage mode of operation.

Discontinuous Reception (DRX) Cycle Operation

In LTE a DRX cycle is used to enable the UE to save its battery. The DRX cycle is used in Radio Resource Control (RRC) idle state but it can also be used in RRC connected state. Examples of lengths of DRX cycles currently used in RRC idle state are 320 ms, 640 ms, 1.28 s and 2.56 s. Examples of lengths of DRX cycles currently used in RRC connected state may range from 2 ms to 2.56 s.

The DRX cycle is configured by a network node such as a radio access node or control network node and is characterized by the following parameters:

On duration: During the on duration of the DRX cycle, a timer called 'on-Duration-Timer', which is configured by the network node, is running. This timer specifies a number of consecutive control channel subframes, e.g. Physical Downlink Control Channel (PDCCH), enhanced Physical Downlink Control Channel (ePDCCH) subframe(s), at the beginning of a DRX Cycle. It is also interchangeably called as DRX ON period. More specifically it is the duration in downlink subframes that the UE after waking up from DRX to receive control channel, e.g. PDCCH, ePDCCH. If the UE successfully decodes the control channel, e.g. PDCCH, ePDCCH, during the ON duration then the UE starts a drx-inactivity timer and stays awake until its expiry. When the onDurationTimer is running the UE is considered to be in a DRX state of the DRX cycle.

drx-inactivity timer: The drx-inactivity timer specifies the number of consecutive control channel, e.g. PDCCH, ePDCCH, subframe(s) after the subframe in which a control channel, e.g. PDCCH, indicates an initial UL or DL user data transmission for this Medium Access Control (MAC) entity. It is also configured by the network node. When the drx-inactivity timer is running the UE is considered to be in a non-DRX state i.e. no DRX is used.

Active time: This time is the duration during which the UE monitors the control channel, e.g. PDCCH, ePDCCH. In other words this is the total duration during which the UE is awake. This includes the "on-duration" of the DRX cycle, the time during which the UE is performing continuous reception while the drx-inactivity timer has not expired and the time the UE is performing continuous reception while waiting for a DL retransmission after one Hybrid Automatic Repeat Request Round-Trip Time (HARQ RTT). The minimum active time is equal to the length of an on duration, and the maximum active time is undefined (infinite).

The DRX ON and DRX OFF durations of the DRX cycle are shown in FIG. 1. The DRX operation with more detailed parameters in LTE is illustrated in FIG. 2 showing where the UE or wireless device shall monitor the PDCCH i.e. during the on Duration period and followed by the opportunity for DRX. Using a wireless device for e.g. M2M communication with present DRX setting is a rather rigid solution and may limit the performance of the wireless communication network.

SUMMARY

An object of embodiments herein is to provide a mechanism that enable an implementation of a communication, such as M2M communication, in an efficient manner.

The object is achieved by providing a method performed by a radio network node for configuring a wireless device, being served by the radio network node, for performing radio measurements. The radio network node determines at least two groups, a first and a second group, of carriers out of a number of carriers, wherein the first group comprises at least one carrier to perform radio measurements on by the wireless device when the wireless device being configured with a DRX cycle above a threshold. The radio network node furthermore transmits a message comprising an indication of the at least one carrier of the first group and informing the wireless device which carrier or carriers to perform radio measurements on when the wireless device is configured with the DRX cycle above the threshold.

The object is further achieved by providing a method performed by a wireless device for performing a radio measurement on at least one carrier, wherein the wireless device is served by a radio network node and is configured with a DRX cycle. The wireless device receives a message comprising an indication indicating the at least one carrier of a first group out of at least two groups to perform radio measurement on when the DRX cycle is above a threshold and a second indication indicating at least one second carrier of a second group to perform radio measurement on when the DRX cycle is equal to or below the threshold or when the DRX cycle is above the threshold but at a different time. The wireless device compares a length of the configured DRX cycle with the threshold, and, when the length is above the threshold, the wireless device performs the radio measurement on the at least one carrier of the first group.

The object is furthermore achieved by providing a radio network node for configuring a wireless device, being served by the radio network node, for performing radio measurements. The radio network node is configured to determine at least two groups, a first and a second group, of carriers out of a number of carriers, wherein the first group comprises at least one carrier to perform radio measurements on by the wireless device when the wireless device being configured with a DRX cycle above a threshold. The radio network node is also configured to transmit a message comprising an indication of the at least one carrier of the first group and informing the wireless device which carrier or carriers to perform radio measurements on when the wireless device is configured with the DRX cycle above the threshold.

The object is furthermore achieved by providing a wireless device for performing a radio measurement on at least one carrier, wherein the wireless device is configured with a DRX cycle. The wireless device is further configured to receive a message comprising an indication indicating the at least one carrier of a first group out of at least two groups to perform radio measurement on when the DRX cycle is above a threshold and a second indication indicating at least one second carrier of a second group to perform radio measurement on when the DRX cycle is equal to or below the threshold or when the DRX cycle is above the threshold but at a different time. The wireless device is configured to compare a length of the configured DRX cycle with the threshold, and when the length is above the threshold the wireless device is configured to perform the radio measurement on the at least one carrier of the first group.

According to embodiments herein the radio network node configures the wireless device with at least two groups of carriers for measurements taking the DRX length into account, the wireless device may then when using an eDRX, i.e. DRX cycle or DRX period>threshold, measures all carriers within the same group in one DRX cycle, e.g. during ON duration of the DRX cycle, e.g. one carrier group per DRX cycle when DRX cycle is longer, e.g. 1-5 minutes.

Reducing the number of carriers to perform measurements on when configured DRX cycle exceeds the threshold results in a reduced complexity of the wireless device and a more battery efficient implementation of the communication improving the performance of the wireless communication network.

BRIEF DESCRIPTION OF THE DRAWINGS

Embodiments will now be described in more detail in relation to the enclosed drawings, in which:

FIG. 3a shows a schematic overview depicting a wireless communication network according to embodiments herein;

DETAILED DESCRIPTION

Figure 1:
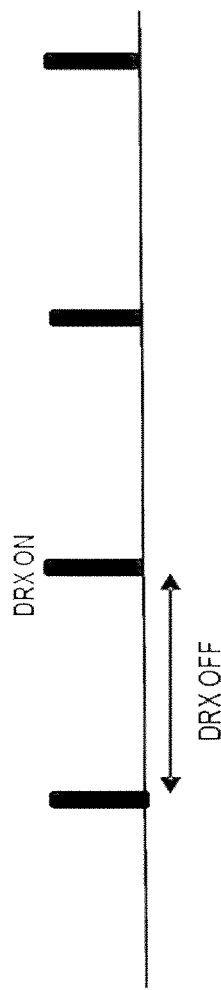
FIG. 1 shows DRX on and DRX off periods.
Figure 2:
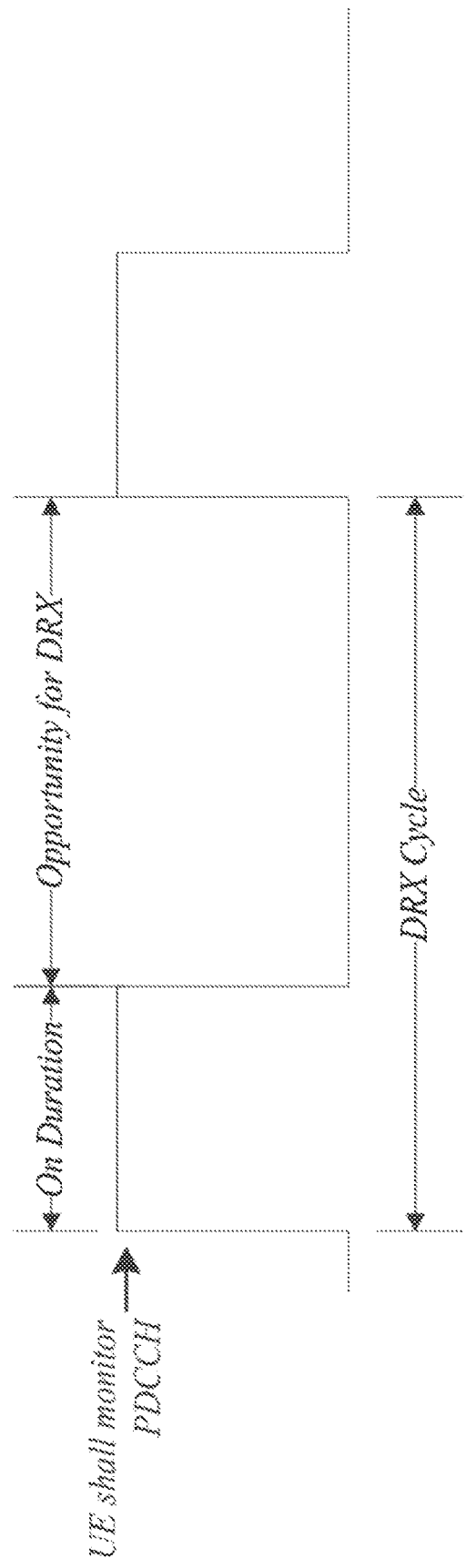
FIG. 2 shows DRX cycle operation in LTE.

As part of developing embodiments herein a problem has first been identified. Radio measurements, also referred to herein as measurements or wireless device measurements, done by the wireless device are typically performed on a serving cell as well as on neighbor cells over some known reference symbols or pilot sequences. The measurements are done on cells on an intra-frequency carrier, inter-frequency carrier(s) as well as on inter-RAT carriers(s), depending upon the wireless device capability whether it supports that RAT. To enable inter-frequency and inter-RAT measurements for the wireless device requiring gaps, the radio network node has to configure the measurement gaps. Inter herein refers to different RATs and frequencies.

The measurements are done for various purposes e.g. mobility, positioning, self-organizing network (SON), minimization of drive tests (MDT), operation and maintenance (O&M), network planning and optimization etc. Examples of measurements in e.g. LTE are Cell identification aka Physical Cell ID (PCI) acquisition, Reference Symbol Received Power (RSRP), Reference Symbol Received Quality (RSRQ), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc. Channel State Information (CSI) measurements performed by the wireless device are used for scheduling, link adaptation etc. by the network. Examples of CSI measurements or CSI reports are Channel Quality Indication (CQI), Precoding Matrix Indicator (PMI), Rank Indicator (RI) etc. They may be performed on reference signals like Common Reference Signal (CRS), Channel State Information Reference Signal (CSI-RS) or Demodulation Reference Signal (DMRS).

The DL subframe #0 and subframe #5 carry synchronization signals, i.e. both Primary Synchronization Signal (PSS) and Secondary Synchronization Signal (SSS). In order to identify an unknown cell, e.g. a new neighbor cell, the wireless device has to acquire the timing of that cell and eventually the PCI. This is called as cell search or cell identification. Subsequently the wireless device also measures RSRP and/or RSRQ of the newly identified cell in order to use itself and/or report the measurement to the network node. In total there are 504 PCIs. The cell search is also a type of measurement. The measurements are done in all RRC states i.e. in RRC idle and connected states.

The existing procedure for performing wireless device measurement was designed for a maximum DRX cycle length of 2.56 seconds. Typically, measurements are filtered, e.g. using an averaging filter, over several DRX cycles so that the effects of short term fading of the radio channel to mobility can be minimized. The methodology used for targeting lower power consumption for MTC may use extended DRX cycle lengths wherein the longest DRX cycle lengths can be up to several 30-40 minutes long. An enhanced DRX (eDRX) cycle is expected to be very long e.g. ranging from several seconds to several minutes and even up to one or more hours and may be implemented for M2M devices. Typical values of eDRX cycles may be between 4-10 minutes. In some cases, e.g. in future it may be in the order of hours. The time between two consecutive DRX cycles is so long that the M2M device internal settings may have changed or the M2M device may have considerably been moved with respect to its earlier physical location. For example, the old serving cell may not be available any longer, the channel conditions may have changed, and/or the interference situation may have changed. With very long DRX cycles it is no longer meaningful to filter or average measurements between several DRX cycles, and the M2M device would instead need to spend a significant amount of time measuring and averaging results for cells on each DRX cycle. In addition, a wireless device such as a M2M device, may be configured to measure on several carriers, which will significantly consume power of the wireless device and increase amount of processing and complexity to the wireless device. Embodiments provides an efficient solution informing which carrier or carriers to perform radio measurements on based on the DRX cycle as configured at the wireless device.

Embodiments herein relate to wireless communication networks in general. FIG. 3a is a schematic overview depicting a wireless communication network 1. The wireless communication network 1 comprises one or more RANs and one or more CNs. The wireless communication network 1 may use a number of different technologies, such as Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a wireless device 10, such as a mobile station, a user equipment and/or a wireless terminal, communicates via a Radio Access Network (RAN) to one or more core networks (CN). It should be understood by the skilled in the art that "wireless device" is a non-limiting term which means any terminal, wireless communication terminal, user equipment, Machine Type Communication (MTC) device, Machin to Machine (M2M) device, Device to Device (D2D) terminal, or node e.g. smart phone, laptop, mobile phone, sensor, relay, mobile tablets or even a small base station communicating within a cell. In particular, the wireless device 10 may be a M2M device with a downlink channel bandwidth of 1.4 MHz for a data channel.

The wireless communication network 1 covers a geographical area which is divided into cell areas, e.g. a cell being served by a radio network node 12. The radio network node 12 may also be referred to as a radio access node such as a radio base station, a NodeB, an evolved Node B (eNB, eNode B), a base transceiver station, Access Point Base Station, base station router, access point, W-Fi access point, or any other network unit capable of communicating with a wireless device within the cell served by the radio network node 12 depending e.g. on the radio access technology and terminology used. The radio network node 12 may serve one or more cells.

The radio network node 12 serving the wireless device 10 may determine based on one or more criteria, e.g. frequency band, at least two group of carriers associated with the radio network node 12. Each group of carriers comprises of at least one carrier, and wherein one or more cells on each carrier within the same carrier group are to be measured by the wireless device 10 during a same DRX cycle period when a present DRX cycle length of a DRX cycle configured for the wireless device 10 is above a threshold. The radio network node 12 may obtain information on whether the wireless device 10 is configured or is expected to be configured with a DRX cycle of a cycle length. The radio network node 12 transmits information about the determined at least two groups of carriers to the wireless device 10 based on the obtained information about the DRX cycle, e.g. only transmitting information when the DRX cycle is above the threshold.

The radio network node 12 may also perform one or more of the following: the radio network node 12 may also decide to configure the wireless device 10 with a pre-start duration to allow the wireless device 10 to wake up prior to a DRX ON duration to measure on the configured group of carriers; and the radio network node 12 may also signal the information to other nodes in the wireless communication network 1.

The radio network node 12 may e.g. transmit data indicating a first group carriers to perform radio measurement on when the DRX cycle is above e.g. 10 seconds and transmit data indicating a second group of carriers to perform radio measurement on when the DRX cycle is equal to or below the threshold 10 seconds. Alternatively, the radio network node 12 may transmit indication of carriers of the first and second groups and a selection process of selecting group is performed in the wireless device 10 based on the DRX cycle configured at the wireless device 10.

The wireless device 10 being served by the radio network node 12 obtains, according to some embodiments herein, information related to the at least two group of carriers. As stated above, each group of carriers comprises at least one carrier, and wherein one or more cells on each carrier within the same carrier group are to be measured by the wireless device 10 during the same DRX cycle period when DRX cycle length of a DRX cycle configured for the wireless device 10 is above the threshold. The wireless device 10 obtains information related to at least one DRX cycle to be used by the wireless device 10. The information may be received from the radio network node 12 configuring the wireless device 10 with settings comprising the length of the DRX cycle. If the length of the at least one DRX cycle being currently used by the wireless device 10 is determined to be above the threshold then performing one or more measurements on one or more cells on each carrier within the same carrier group during the same length of the DRX cycle. The wireless device 10 may further perform one or more of the following additional actions: If the length of the at least one DRX cycle being currently used by the wireless device 10 is determined to be above the threshold then not performing, or omitting, filtering or averaging operations which include measurement results from a previous DRX cycle, but rather performing all filtering or averaging of the measurements only within the time of reception of the current DRX cycle; and if the length of the at least one DRX cycle being currently used by the wireless device 10 is determined to be above the threshold then interleaving in time the measurements of cells on different carrier frequencies such that measurement samples which are not made at immediately adjacent times are available for filtering or averaging.

Embodiments herein enable the wireless device 10 configured with a DRX cycle above the threshold to perform measurement on one or more carriers in an intelligent way resulting in more reliable measurements. Embodiments herein reduce the processing power of the wireless device 10 and thereby also power consumption for the wireless device 10 as compared to an eDRX capable wireless device measuring on all carriers. Thus, embodiments herein enable the wireless device 10 to perform, report and/or use the measurements when e.g. an eDRX is used without any significant impact on the power consumption.

Figure 3B:
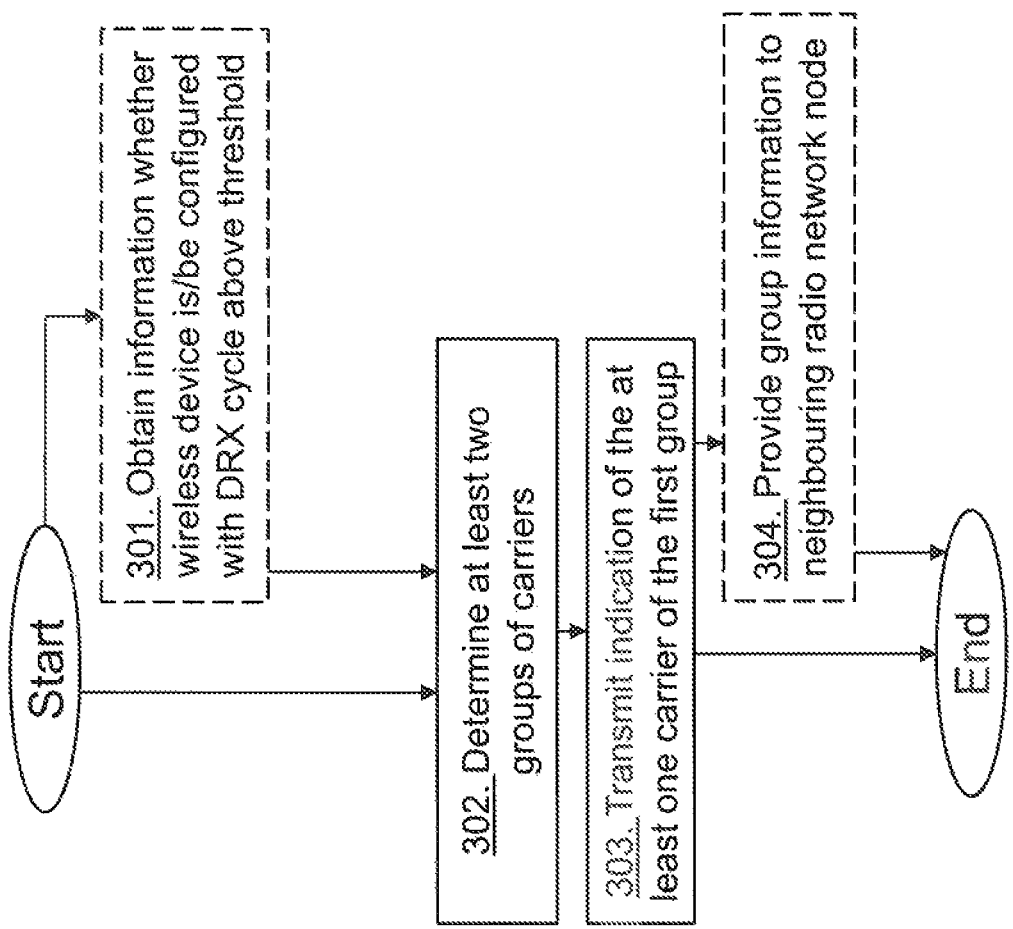
FIG. 3b shows a flowchart depicting a method performed by a radio network node according to embodiments herein.

The method actions performed by the radio network node 12, for configuring a wireless device 10, being served by the radio network node 12, for performing radio measurements according to some embodiments will now be described with reference to a flowchart depicted in FIG. 3b. The actions do not have to be taken in the order stated below, but may be taken in any suitable order. Actions performed in some embodiments are marked with dashed boxes.

Action 301.

The radio network node 12 may obtain information whether the wireless device 10 is configured or expected to be configured with the DRX cycle above the threshold.

Action 302.

The radio network node 12 determines at least two groups, the first and the second group, of carriers out of a number of carriers, wherein the first group comprises at least one carrier to perform radio measurements on by the wireless device 10 when the wireless device 10 is configured with a DRX cycle above a threshold. E.g. the radio network node 12 may obtain information regarding grouping of the carriers. The radio network node 12 may determine the groups by taking the obtained information in action 301 into account. The radio network node 12 may determine the groups by taking one or more of the following into account:

Received group information from a neighbouring radio network node, which group information indicates groups of carriers created at the neighbouring radio network node. The group information may be received from a neighbour node;

Received group information from the wireless device 10, which group information indicates groups of carriers recommended by the wireless device;

Measurement performance of one or more wireless device measurements on one or more carrier frequencies to be achieved;

Frequency bands used in a coverage area where the wireless device 10 operates while in Out of Network Coverage;

Carrier frequencies within identified bands used in a coverage area where the wireless device 10 operates while in Out of Network Coverage;

Radio Access technologies within identified bands used in a coverage area where the wireless device 10 operates while in Out of Network Coverage;

Capability of the wireless device 10 in terms of supported bands; and

Capability of the wireless device 10 in terms of supported Radio Access technologies on different bands supported by the wireless device 10.

Action 303.

The radio network node 12 transmits, e.g. broadcasts or through dedicated signaling, the message, e.g. RRC signalling or Non-Access Stratum (NAS) signalling, comprising the indication of the at least one carrier of the first group and informing the wireless device which carrier or carriers to perform radio measurements on when the wireless device 10 is configured with the DRX cycle above the threshold.

The indication may be an identifier of the first group e.g. a Group ID or an identifier of the at least one carrier e.g. Carrier ID.

The message may comprise data indicating the at least one carrier of the first group to perform radio measurement on when the DRX cycle is above the threshold and data indicating at least one second carrier of the second group to perform radio measurement on when the DRX cycle is equal to or below the threshold, e.g. the Second group may be for non MTC devices. The message may comprise data indicating the at least one carrier of the first group to perform radio measurement on within the same DRX cycle when the DRX cycle is above the threshold and data indicating at least one second carrier of the second group to perform radio measurement on within the same DRX cycle but at different time when the DRX cycle is above the threshold.

The radio network node 12 may transmit configuring information indicating one or more carriers comprising the at least one carrier in the first group to perform radio measurements on in odd DRX cycles and one or more carriers in the second group to perform radio measurements on in even DRX cycles, e.g. all carriers are used but measured every second DRX cycle.

The radio network node 12 may transmit a start indication of a pre-start duration, which start indication allows the wireless device 10 to wake up prior to a start of an ON duration interval to perform radio measurements.

The radio network node 12 may transmit a scaling factor indicating a fraction of a total available measurement time to use for one or more of the at least two groups.

Action 304.

The radio network node may provide group information to a neighbouring radio network node, which group information indicates the determined groups.

Figure 3C:
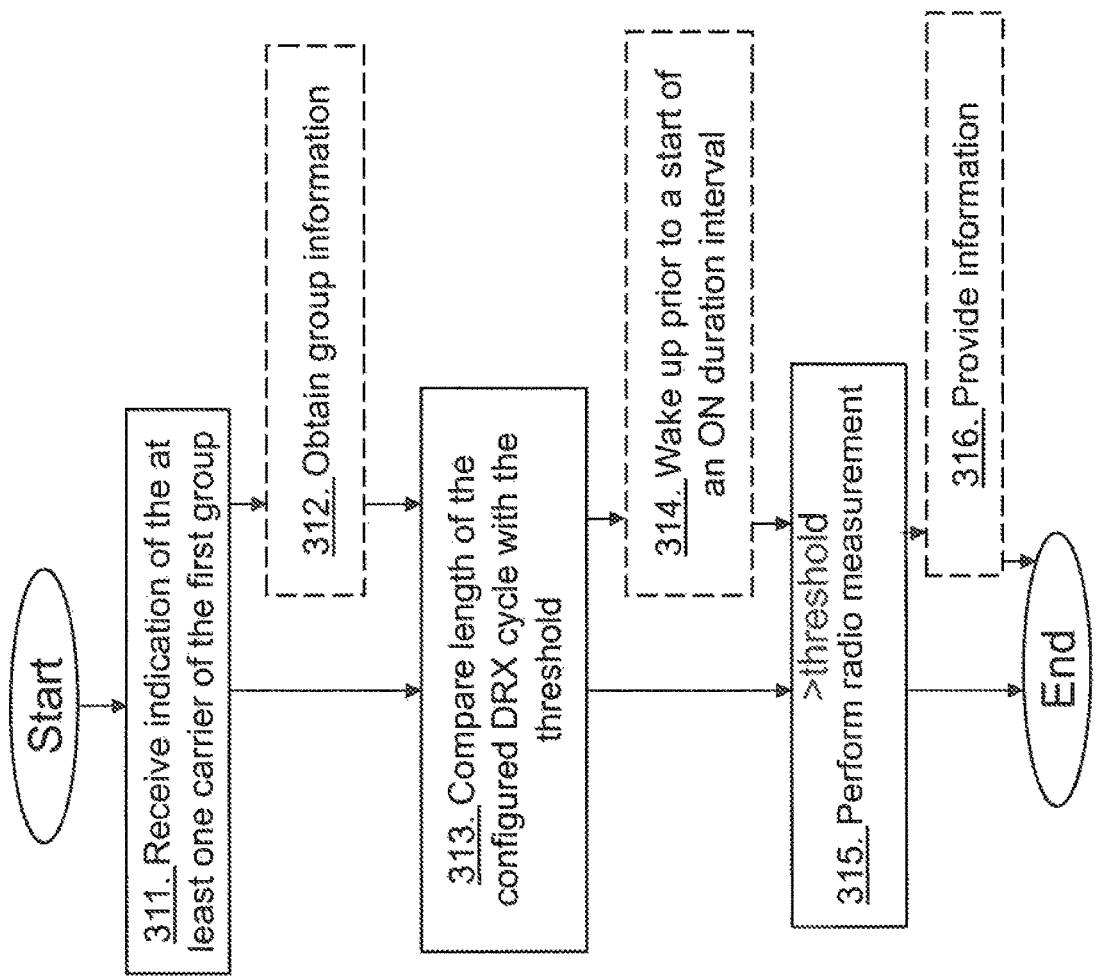
FIG. 3c shows a flowchart depicting a method performed by a wireless device according to embodiments herein.

The method actions performed by the wireless device 10 for performing a radio measurement on at least one carrier according to some embodiments will now be described with reference to a flowchart depicted in FIG. 3c. The actions do not have to be taken in the order stated below, but may be taken in any suitable order. Actions performed in some embodiments are marked with dashed boxes. The wireless device 10 is served by the radio network node 12 and is configured with a DRX cycle.

Action 311.

The wireless device 10 receives the message comprising the indication indicating the at least one carrier of the first group out of at least two groups to perform radio measurement on when the DRX cycle is above a threshold and the second indication indicating at least one second carrier of a second group to perform radio measurement on when the DRX cycle is equal to or below the threshold or when the DRX cycle is above the threshold but at a different time. The indication may be an identifier of the first group or an identifier of the at least one carrier, and/or the second indication may be a second identifier of the second group or a second identifier of the at least one second carrier. The wireless device 10 may receive configuring information indicating the at least one carrier of the first group to perform radio measurement on within the same DRX cycle when the DRX cycle is above the threshold and data indicating at least one second carrier of the second group to perform radio measurement on within the same DRX cycle but at different time when the DRX cycle is above the threshold.

The wireless device 10 may receive configuring information indicating one or more carriers comprising the at least one carrier in the first group to perform radio measurements on in odd DRX cycles and one or more second carriers comprising the at least one second carrier in the second group to perform radio measurements on in even DRX cycles. The wireless device 10 may receive the scaling factor indicating the fraction of the total available measurement time to use for one or more of the at least two groups. In some embodiments the wireless device 10 receives the start indication of the pre-start duration.

Action 312.

The wireless device 10 may obtain the group information indicating one or more carriers comprising the at least one carrier in the first group to perform radio measurements on, and one or more second carriers comprising the at least one second carrier in the second group to perform radio measurements on. The wireless device 10 may obtain the group information by determining the group information based on one or more of the following:

Frequency bands used in a coverage area where the wireless device 10 operates while in Out of Network Coverage;

Carrier frequencies within identified bands used in a coverage area where the wireless device operates while in Out of Network Coverage;

Radio Access technologies within identified bands used in a coverage area where the wireless device operates while in Out of Network Coverage;

Capability of the wireless device in terms of supported bands;

Capability of the wireless device 10 in terms of supported Radio Access technologies on different bands supported by the wireless device 10;

Measurement performance of one or more wireless device measurements on one or more carrier frequencies to be achieved; and The wireless device 10 may transmit the determined group information to the radio network node 12.

Action 313.

The wireless device 10 compares the length of the configured DRX cycle with the threshold.

Action 314.

The wireless device 10 may wake up prior to a start of an ON duration interval based on the received indication of the pre-start duration.

Action 315.

When the length is above the threshold, the wireless device 10 performs the radio measurement on the at least one carrier of the first group.

E.g. when the length is above the threshold, the wireless device 10 performs the radio measurement on the one or more carriers of the first group in odd DRX cycles and on the one or more second carriers of the second group in even DRX cycles. The radio network node 12 may take the received scaling factor into account when performing the radio measurement.

Action 316.

The wireless device 10 may provide information to the radio network node 12, which information is whether the wireless device 10 is configured or expected to be configured with the DRX cycle above the threshold.

In some embodiments the radio network node 12 may be referred to as a more general term "network node" and it can correspond to any type of radio network node or any network node, which communicates with the wireless device 10 and/or with another network node. Examples of network nodes are NodeB, Master eNB, Secondary eNB, a network node belonging to Master Cell Group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), core network node e.g. Mobile Switching Centre (MSC), Mobility Management Entity (MME) etc., Operation and Maintenance (O&M), Operations System Support (OSS), Self-Organizing Network (SON), positioning node e.g. Enhanced Serving Mobile Location Centre (E-SMLC), MDT etc.

In some embodiments the non-limiting term wireless device is used and it refers to any type of wireless device communicating with a network node and/or with another wireless device in a cellular or mobile communication system. Examples of the wireless device 10 are a target device, device to device (D2D) UE, proximity capable UE (ProSe UE), machine type UE or UE capable of machine to machine (M2M) communication, PDA, PAD, Tablet, mobile terminals, smart phone, laptop embedded equipped (LEE), laptop mounted equipment (LME), Universal Serial Bus (USB) dongles etc.

The embodiments herein are applicable to single carrier as well as to multicarrier or carrier aggregation (CA) operation of the wireless device 10 in which the wireless device 10 is able to receive and/or transmit data to more than one serving cells. The term carrier aggregation (CA) is also called "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The embodiments are described for LTE. However the embodiments are applicable to any RAT or multi-RAT systems, where the wireless device receives and/or transmits signals, e.g. data, e.g. LTE FDD/TDD, WCDMA/HSPA, GSM/GERAN, Wi-Fi network, WLAN, CDMA2000 etc.

Below will follow a general description of scenarios, a description of a method performed by the radio network node 12 for configuring the wireless device 10 with carrier groups for measurement procedure under eDRX, a description of a method performed by the wireless device 10 for obtaining and using carrier groups for a measurement procedure under eDRX.

According to embodiments herein the radio network node 12 serves a first cell, the Pcell for the wireless device 10. The wireless device 10 may also be configured with one or more additional cells on-need basis, say SCell(s) in carrier aggregation (CA). In some embodiments one or more SCells may be served by a second radio network node but also by the radio network node 12. The embodiments presented herein apply regardless of whether PCell and one or more SCells are served by the same or different network nodes. In some embodiments the wireless device 10 may be configured with PCell and PSCell or with PCell, PSCell and one or more SCells such as in dual connectivity. The configured cells are wireless device specific aka serving cells of the wireless device 10. There may be one or more wireless devices in a cell. The embodiments are applicable for the wireless device 10 being in any RRC state e.g. in low RRC activity state such as in idle state, in high RRC activity state such as in RRC connected state. Typically the wireless device 10 may be configured by the radio network node 12 with the DRX cycle, especially when there is no or insignificant traffic activity for the wireless device 10 in connected state. In the existing DRX related procedures the wireless device 10 may be configured with a length of up to 2.56 seconds, but the wireless device 10 supporting eDRX may be configured with a DRX cycle at least longer than 2.56 seconds and typically much longer than 2.56 seconds i.e. in order of several seconds to several minutes. E.g. the threshold may be 3 seconds. One or more new measurement procedures are disclosed herein for enabling the wireless device 10 to measure when being in the eDRX cycle. One reason is that the time between two consecutive DRX cycles is so long that the internal settings of the wireless device 10 may have changed or the wireless device 10 may have considerably been displaced with respect to its earlier physical location. For example, the old serving cell may not be available any longer, the channel conditions may have changed, and the interference situation may have changed. Hence, reusing measurement samples/settings across successive DRX ON durations may not be useful and/or it may give unreliable measurement results. The embodiments presented in this disclosure address this problem. The wireless device 10 configured with eDRX may or may not be stationary. The new measurement procedures are further enhanced for the wireless device 10 with eDRX when it is stationary all the time or temporarily stationary or when operating with limited mobility.

Typically eDRX cycle capable wireless device 10 is configured or pre-configured by the radio network node 12 with an information element (IE) or a message associated with at least two group of carriers, e.g. a carrier group measurement IE, enabling the wireless device 10 to measure on cells of one or more carriers with the configured groups. The carriers can be intra-frequency, inter-frequency and inter-RAT carriers. The same or different set of carrier groups may be configured for measurements in RRC idle and connected states. The configured set of carrier groups may be cell specific, i.e. same for all wireless devices or group of wireless devices in the cell, or may be wireless device specific, i.e. configure for each wireless device separately.

The measurements are used by the radio network node 12 and/or the wireless device 10 to support functionalities such as mobility, CGI acquisition, positioning, SON, Automatic neighbour relations (ANR) etc.

The number of carriers a wireless device is configured to measure on may vary. In some cases a wireless device may be configured to measure on up to thirteen carriers, and in other cases it can be configured to measure on four carriers. The power consumption and baseband processing complexity increases with number of carriers the wireless device 10 is configured to measure on. The problem may arise when a wireless device, which is configured with eDRX, attempts to measure on many carriers. As mentioned earlier, reusing the measurement samples/settings across successive DRX ON durations may not work, thus a wireless device may not have the capacity to perform complete measurements on all configured carriers during the DRX. Using the existing procedure of prior art, a wireless device measures on all configured carriers during the ON-durations which may result in significant impact on the processing amount and thus also significantly increased power consumption. For example, a wireless device 10 configured with eDRX and configured to measure on 10 carriers may need to measure on all 10 carriers during the ON-durations since reusing samples across ON-durations may not be useful. This may require vast processing power and power consumption.

Figure 4:
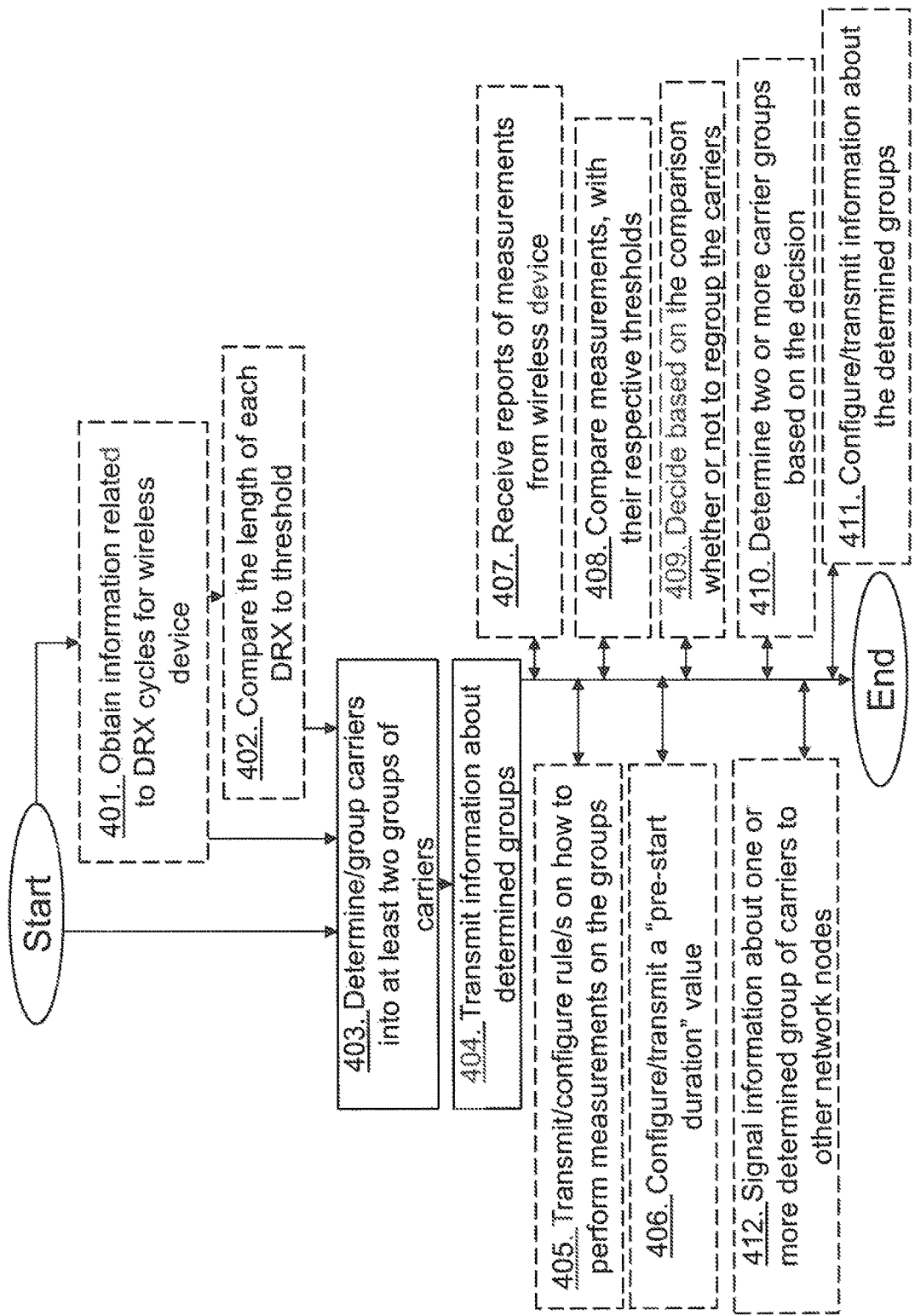
FIG. 4 shows a flowchart depicting a method performed by a radio network node according to some embodiments herein.

Some embodiments herein solve this problem by providing a method performed by the radio network node 12 for configuring the wireless device 10 for measurement procedure under DRX operation. The overall procedure in the radio network node 12 can be summarized in FIG. 4, the actions do not have to be taken in the order stated below, but may be taken in any suitable order and actions performed in some embodiments are marked with dashed boxes, as follows:

Action 401.

Radio network node 12 may obtain information related to DRX cycles being used or expected to be used by the wireless devices.

Action 402.

The radio network node 12 may then compare the length of each DRX cycle being used or expected to be used by the wireless device 10 with a threshold or a DRX threshold. The threshold may be preconfigured or pre-set.

Action 403.

The radio network node 12 decides based on the comparison whether or not to create a group of carriers to be used by the wireless device 10 for performing one or more measurements. That is, the radio network node 12 determines/groups carriers into at least two groups of carriers, e.g. the first and the second group.

If it is determined that a longest DRX cycle is greater or longer than the threshold, the radio network node 12 may determine, based on one or more criteria, at least two groups of carriers out of the available carriers, where each group comprises of at least one carrier and wherein cells on carriers in the same group are to be measured by the wireless device 10 within the same DRX cycle. The radio network node 12 may then configure said wireless device 10 with at least the determined at least two groups of carriers enabling the wireless device 10 to perform one or more measurements on one or more cells belonging to the configured group of carriers.

If it is determined that the longest DRX cycle is not greater than the threshold then configuring said wireless device 10 with all available carriers, i.e. in legacy manner, which are to be measured by the wireless device 10. In the legacy approach carriers are configured in groups, so the wireless device 10 can measure on carriers in any order or sequence or at the same or different times.

Action 404.

The radio network node 12 transmits information about the determined groups of carriers to the wireless device 10 for enabling the wireless device 10 to perform one or more measurements on the carrier/s of at least one group.

Action 405.

The radio network node 12 may further configure said wireless device 10, or transmit to the wireless device 10, with one of a plurality of pre-defined rules or with a configurable rule on how to perform measurements on the configured groups of carriers.

Action 406.

The radio network node 12 may additionally configure or transmit to said wireless device 10 with a "pre-start duration" value, e.g. X ms. This means that the wireless device 10 may start X ms prior to the start of the ON duration of the DRX cycle to perform measurements.

Action 407.

The radio network node 12 may receive reports of measurements from the wireless device 10.

Action 408.

The radio network node 12 may compare one or more measurements, e.g. RSRP, RSRQ, with their respective thresholds.

Action 409.

The radio network node 12 may then decide based on the comparison whether or not to regroup the carriers for creating carrier groups for the wireless device 10 to do measurements.

Action 410.

The radio network node 12 may then determine two or more carrier groups based on the decision to regroup or not.

Action 411.

The radio network node 12 may then configure/transmit the wireless device 10 with information about the determined two or more carrier groups of carriers to perform measurements.

Action 412.

The radio network node 12 may furthermore signal information about one or more determined group of carriers to other network nodes.

In action 401, the radio network node 12 obtains information on whether the wireless device 10 is configured with or is expected to be configured with at least one DRX cycle. The wireless device 10 may be configured with one or more DRX cycles. The radio network node 12 may further obtain the DRX related information of the DRX cycle(s), e.g. DRX cycle length, ON duration length etc. This information is generally available at the radio network node 12. For example if the wireless device 10 is configured with the DRX cycle(s) then the associated parameters of the DRX cycle(s) are stored in the memory of the radio network node 12. In this case the radio network node 12 may retrieve the DRX related information from the memory. The radio network node 12 may use this information to compare the DRX cycle length of each DRX cycle with a DRX threshold, see action 402 above. This DRX threshold may be a pre-defined threshold or a configurable threshold and the DRX threshold is used to decide when to enable embodiments herein. If it is assessed that the length of a longest DRX cycle configured for this wireless device 10 is greater than the DRX threshold then the radio network node 12 activates the process as claimed herein and thereby enables the wireless device 10 to adapt the measurement procedure.

The next action 403 comprises numerous sub-steps. As part of the adapting procedure, the radio network node 12 groups the available carriers into at least groups which are used by the wireless device 10 for performing one or more measurements with respect to the DRX cycle. For example the wireless device 10 is required to perform measurements on carriers in the same group during the same DRX cycle length e.g. before and/or during the ON duration of the DRX cycle. The wireless device 10 may typically measure on carriers of one of the configured groups of carriers in the same DRX cycle length. The wireless device 10 may however also measure on carriers of more than one group of carriers in the same DRX cycle length. As an example the wireless device 10 may measure on carriers of more than one group of carriers in the same DRX cycle length if DRX cycle length is longer than a second threshold e.g. second DRX threshold is set to be longer than 3 minutes.

Different approaches or criteria can be used for grouping the carriers and this is explained herein.

Contents of Carrier Group Information

This information comprises of at least two groups of carriers. An example of such grouping mechanism would be as follows:

Group A: carrier identifiers #1, 3, 5
Group B: carrier identifiers #2, 4, 6
Group C: carrier identifiers #7, 8, 9

This information may also comprise groups which contain partly overlapping carriers. An example of such grouping mechanism would be as follows:

Group D: carrier identifiers #1, 3, 5
Group E: carrier identifiers #1, 4, 6
Group F: carrier identifiers #5, 8, 9

The term carrier may interchangeably be called frequency, carrier frequency, frequency channel, carrier frequency channel, radio frequency channel, frequency layer, layer etc.

Each group is assigned one of a pre-defined identifiers. For example if maximum possible groups are 8 then ID from 0 to 7 can be assigned to different groups.

The carrier identifiers may be associated Time Division Duplex (TDD) band, Full Duplex Frequency Division Duplex (FD-FDD) band or HD-FDD bands, full duplex bands etc. In case of FD-FDD and HD-FDD the carrier identifiers may be associated with UL carrier, DL carrier or separately for both UL and DL carriers. The carrier identifier may be expressed as pre-defined identifier, temporarily assigned ID, an ID of carriers pre-configured at the wireless device 10 or frequency channel number, e.g. absolute radio frequency channel number (ARFCN), UMTS Absolute Radio Frequency Channel Number (UARFCN), Evolved absolute radio frequency channel number (EARFCN) etc.).

The information about the determined at least two groups of carriers is then configured or signalled to said wireless device 10 for doing one or more measurements as explained below. This signalled information may further comprise information and/or rule on how the wireless device 10 is to perform the measurements on the configured group of carriers. The rule may indicate for example in which order the groups are measured, the priorities of different groups and how they are used etc. This rule may be used by the wireless device 10 when performing measurements.

The radio network node 12 may also create and configure the wireless device 10 with the pre-start duration, X. The pre-start duration is used to enable the wireless device 10 to wake up X ms prior to DRX ON duration to have enough time to measure on all configured carriers. For example, if the groups of carriers contain many carriers and DRX ON duration is relatively short, then the pre-start duration has to be relatively long in order for the wireless device 10 to have enough time to measure on all carriers. On the contrary, if the groups of carriers contain fewer carriers and DRX ON duration is long enough for the wireless device 10 to perform measurements on all configured carriers, then pre-start duration may not be necessary. However, in typical MTC operation with eDRX, the DRX cycles are expected to be quite long meaning that the wireless device 10 is expected to be in IDLE mode for most of the time. During the IDLE mode the wireless device 10 is not able to measure on the downlink carriers and thus the ON-duration time may not be enough to measure on all configured carriers. Therefore it may be necessary to create and configure the wireless device 10 with pre-start duration. The length of the pre-start duration X may be based on length of DRX cycles and/or number carriers of the group of carriers that the wireless device 10 is configured to measure on. The length of the pre-start duration X can be selected by the radio network node 12 based on one or more criteria e.g. values of the pre-start duration X are selected to ensure there is sufficient power saving of the wireless device 10 when measuring on carriers. For example if the number of carriers in the group of carriers is large and the longer the DRX cycles, the longer is the pre-start duration. In addition to the signaling of carrier group information the radio network node 12 may also signal the information on the pre-start duration to the said wireless device 10. In some embodiments the relation between the length of the pre-start duration X and DRX cycles and/or number carriers can also be pre-defined. In some embodiments the relation between several values of the length of the pre-start duration X and DRX cycles and/or number carriers can also be pre-defined; in this case the radio network node 12 may signal the identifier of one of the pre-defined values of pre-start duration X.

During the pre-start duration X the wireless device 10 may continuously or periodically activate its receiver to perform measurements on one or more cells. The pre-start duration X may be used by the wireless device 10 for any type of measurement or for specific type of measurements e.g. mobility related such as cell search, RSRP, RSRQ, positioning related such as Observed Time Difference Of Arrival (OTDOA) RSTD, Enhanced Cell ID (E-CID) UE Rx-Tx time difference etc. The wireless device 10 may or may not be able to receive data channel and/or control channel during the pre-start duration X.

The signaled information to the wireless device 10 may also comprise of one or more DRX cycles and/or one or more DRX cycle thresholds which are associated with two or more carrier groups. As an example there may be two sets of groups, a first and a second group, each associated with one DRX cycle i.e. a first DRX cycle and a second DRX cycle. Examples of the first DRX cycle and the second DRX cycle and/or are 30 seconds and 3 minutes respectively. In this example the wireless device 10 may measure on carriers belonging to the first group of carriers when operating in the first DRX cycle and on carriers belonging to the second group of carriers when operating in the second DRX cycle. In another example there may be two sets of groups, a first and a second group, and one DRX cycle threshold. An example of the DRX cycle threshold is 30 second. In this second example the wireless device 10 may measure on carriers belonging to the first group when the DRX cycle used by the wireless device 10 is not larger than the DRX cycle threshold and on carriers belonging to the second group when the DRX cycle used by the wireless device 10 is larger than the DRX cycle threshold.

The signaled information may also comprise of one or more scaling factors, K, which scaling factors are used by the wireless device 10 for sharing time duration for performing measurements on different group of carriers.

In general the scaling factor K can be expressed in terms of one dimensional vector of size N as expressed by (1):

$$K=[K_1, K_2, K_3, \ldots, K_N] \quad (1)$$

where:

$$\sum_{i=1}^{N} K_i = 1;$$

$K_i$ is the scaling factor for $i^{th}$ carrier group;

N is the total number of carrier groups configured at the wireless device 10 for measurements:

According to (1), the wireless device 10 assigns $K_i$ % of the total available measurement time of the pre-start duration X and the ON duration period for measuring on carriers of the $i^{th}$ carrier group.

The values of K, i.e. vector of size N, can also be pre-defined in the standard. If there are plurality of values of the vector K then the radio network node 12 may signal one set of the values of the vector K to the wireless device 10.

A default value of the scaling factor K may also be defined as expressed by (2):

$$K_{default} = 1/M_{groups} \quad (2)$$

where:

$K_{default}$ is the default value of the scaling factor K; and
$M_{groups}$ is the total number of carrier groups configured at the wireless device 10 for measurements.

For example if $M_{groups}=2$ then $K=\frac{1}{2}$. In this case the wireless device 10 may equally share time for measuring on the first and the second group of carriers. As an example the wireless device 10 may measure on the first and the second group of carriers during alternating DRX cycles. If $M_{groups}=3$ then $K=\frac{1}{3}$. In this case the wireless device 10 will spend one third of the total available measurement time for measuring on each of the three carrier groups.

The radio network node 12 also has the flexibility to adapt the carrier group information based on the received measurements. Typically the wireless device 10 is configured to report the result of performed downlink measurement on a periodic-, event-triggered basis or event-triggered periodic basis. The radio network node 12 may evaluate the quality of the reported measurement and adapt the grouping accordingly. For instance, if the received measurement indicates measurements of acceptable quality then the radio network node 12 may choose to keep the current grouping information unchanged. However, if the reported measurement result indicates poor quality e.g. being below a signal threshold, then the radio network node 12 may change the grouping such as increase pre-start duration, or changing carriers in the group for the wireless device 10 that have higher priority, etc. If the grouping information is changed, then the radio network node 12 may signal that information to the said wireless device 10.

The radio network node 12 may also signal the derived information related to measurement procedure to other nodes in the wireless communication network 1. This is explained below.

Figure 5:
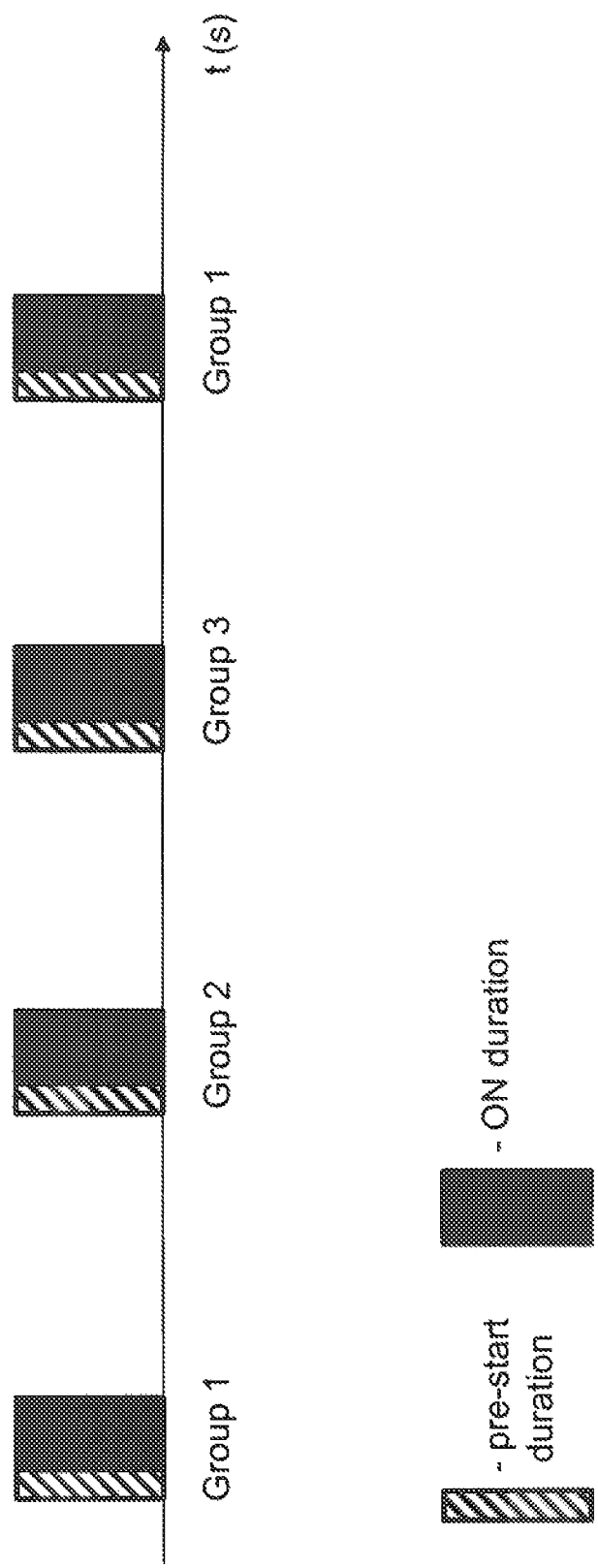
FIG. 5 shows a time line with a DRX cycle according to embodiments herein.

One typical example of the procedure of a wireless device 10 configured with a pre-start duration to wake up prior to DRX ON duration and to measure on different groups on each pre-start duration and DRX ON duration is illustrated in FIG. 5. The wireless device 10 in this example is configured with 3 different groups of carriers, group 1, group 2, group 3, and the wireless device 10 starts its measurement in the pre-start duration X which is marked with diagonal stripes. The rule in this example is that wireless device 10 performs measurement first on group 1, then group 2, and finally on group 3 during different DRX cycles i.e. all carriers of the same group in one DRX cycle. This pattern is then repeated.

Criteria of Grouping Carriers for Measurements Under eDRX

According to some embodiments herein the radio network node 12 performs grouping of carriers in an intelligent way to adapt the measurement procedure of wireless device configured with the DRX period above the threshold value. The grouping of carriers may be done in different ways depending on the criteria, purpose or objective to be achieved, e.g.:

Load Balancing:

In a first example, the purpose of grouping carriers can be to achieve load balancing i.e. using results of measurements of wireless devices for balancing load of wireless devices on different carriers. The load balancing is done in semi-static manner and based on measurements of a wireless device from a plurality of wireless devices. Therefore in this case the wireless device 10 may send measurement reports with relatively longer delay e.g. in order of several frames to several seconds;

Measurement Performance:

In a second example, the purpose may be to achieve an accurate measurement with no or minimal delay i.e. better performance of the measurement. For example the measurements may be used for positioning of the wireless device 10, cell change etc.

Carrier Priority:

In a third example, priority of different carriers can play an important role when grouping the carriers. That is, priority of carriers may be taken into account when determining the group of carriers.

Characteristics or Property of Carriers:

In a fourth example, the grouping of carriers can be based on characteristics or property of carriers i.e. group carriers of same or similar characteristic. Examples of characteristics of carriers are frequency range, frequency band, type of RAT etc.

Wireless Device Recommended Grouping:

In a fifth example, the grouping of carriers can be based on recommendation received from the wireless device 10 i.e. the wireless device 10 may recommend which carriers are to be grouped into a first group for the wireless device 10.

Wireless Device Capability Related to Grouping:

In a sixth example, the grouping of carriers may be based on capability information of the wireless device 10 related to handling of carriers in different groups. For example the wireless device 10 may or may not be capable of measuring on carriers in carrier groups when DRX cycle is longer than a threshold. Even if the wireless device 10 has such capability, i.e. can measure on carriers in carrier groups when DRX cycle is longer than the threshold, the wireless device 10 may have some measurement limitations. For example the wireless device 10 may be capable of measuring on a certain maximum number of carriers within a group and/or on a certain maximum number of groups. The radio network node 12 based on such wireless device capabilities may decide whether to configure the wireless device 10 with carrier groups. The radio network node 12 may also use additional information in the wireless device capability to decide the number of carriers per group and/or number of groups to be configured for such wireless device 10. The radio network node 12 may acquire the wireless device capability information related to handling of carriers in different groups by receiving it from the wireless device 10 and/or from another network node that contains such information.

Pre-Defined Rule(s):

In a seventh example the grouping of carriers can be based on one or more pre-defined rules. An example of rule can be that the carriers of the same or similar characteristics or property are to be grouped in the same carrier group. Specific examples of such rules are:

carriers in the same group belong to the same frequency band,
carriers in the same group belong to the same RAT,
carriers in the same group are within a certain frequency range e.g. within 100 MHz.

The specific examples of some of the factors, which are in particular related to the characteristics of carriers and which may be taken into account by the radio network node 12 when performing grouping are:

Number of bands available for measurement
Priorities of bands
Operating bands
Types of carriers These factors are explained in more detail below one by one using examples.

Number of Bands Available for Measurements:

Number of bands available at the wireless device 10 for the measurement can be taken into account when deciding on the group size and also pre-start period. If there is more number of bands available for measurements, then it may take longer time for the wireless device 10 to measure on all those carriers and also it may consume more power and also more amount of processing in the wireless device 10. If the number of bands is less, then wireless device 10 may measure more frequently.

The information on number of bands can also be used in combination with length of ON duration and/or length of DRX cycle. The ON duration and the length of DRX cycle that the wireless device 10 is configured with may be pre-defined. The number of carriers in group may depend on these two parameters. When the wireless device 10 is IDLE for long time, e.g. DRX cycle>=5 min, the wireless device 10 may need to measure on many carriers as possible since the radio environment may change quickly between two ON durations. In such an example, it may be necessary to create the group with many carriers in order to measure on as many carriers as possible between two ON-durations. Embodiments herein may perform measurements on all carriers, but in a more intelligent manner that what the legacy procedure allows. For example, grouping the carriers in a certain way so that wireless device 10 could perform measurements on carriers in one group at time. On the contrary, when the wireless device 10 is configured with a short DRX cycles, e.g. DRX cycle<5 min, the wireless device 10 may wake up relatively more often during the ON-durations and thus also perform measurements more often. This means that the changes in the radio environments can be tracked more accurately compared to the case with longer DRX cycles. In such an example, it may be beneficial to split the carriers among many groups since wireless device 10 will be in ON-durations more often and thus will also have time to measure on more carriers.

Although the principles of efficiently grouping the carriers for measurements are exemplified for wireless devices under eDRX case, it shall be noted that the same principle can be applied for grouping of Secondary Component Carriers (SCC) in two or more groups.

Priorities of Bands:

Another factor that can be taken into account when grouping the carriers for measurement is the priority of bands/carriers. In some cases, the carriers available for measurements may have different priorities, e.g. dedicated carriers for a special service. There may exist dedicated carriers which are intended for service of certain types in future, e.g. MTC communication or D2D communication including public safety communication. In such scenarios, each carrier may have different priorities. For example, the public safety carrier may have a higher priority than a MTC carrier. A cellular carrier may have higher priority than a MTC carrier etc. High priority carriers may be prioritized for measurements in case the wireless device 10 is configured with long DRX cycles while the same carriers may be equally split between groups in case the wireless device 10 is configured with short DRX cycles. In short DRX cycles it is possible to measure on many carriers since the wireless device 10 wakes up more frequently and this it is possible to have many groups. In the case of long DRX, the wireless device 10 may not be able to measure as frequently and therefore it is beneficial to limit the number of carriers in some cases and it such cases it is beneficial to prioritize the high-priority carriers.

Operating Bands:

The grouping of carriers may also be performed by taking into account the operating band. For examples, the frequency range of carriers differs depending on which band they belong to. A carrier which belongs to a lower band may have larger range than a carrier on a higher band. The grouping can be done such that the carriers of each band belong to the same type. As an example, group 1 may comprise carriers in the 900 MHz band, group 2 may comprise carriers<2.0 GHz, and group 3 may comprise carriers which are >=2.0 GHz.

Types of Carriers:

The grouping of carriers may also take into account the carrier type. Examples of types are intra-frequency-, inter-frequency- and inter-RAT carriers. One example of grouping would be to put all the carriers of same type into the same group, e.g. intra-frequency carriers in group 1, inter-frequency carriers in group 2 and inter-RAT carriers in group 3. This may simplify the measurement procedure a lot. The wireless device 10 can perform measurements on intra-frequency carriers without interrupting the existing operation. For inter-frequency measurements and inter-RAT measurements the wireless device 10 needs to create measurement gaps. The gaps are used to retune a receiver chain to another carrier frequency on which the wireless device 10 intends to perform measurement on. By grouping the carriers of same type, the measurement procedure can be greatly simplified and improved.

Method of Signaling Information about Group of Carriers to the Wireless Device 10.

In this embodiment the radio network node 12 signals the wireless device 10 with information related to carrier groups for measurement on one or more of: intra-frequency, inter-frequency and inter-RAT measurements when the wireless device 10 is configured with eDRX see action 404 above. In one example the radio network node 12 may configure the wireless device 10 with two or more groups of carriers containing either inter-frequency or inter-RAT carriers for enabling the wireless device 10 to perform the corresponding measurements. In a second example the radio network node 12 may configure the wireless device 10 with two or more groups of carriers containing any combination of inter-frequency as well as inter-RAT carriers. In a third example the radio network node 12 may configure the wireless device 10 with two or more groups of carriers comprising any combination of intra-frequency, i.e. serving cell carrier, inter-frequency and inter-RAT carriers. In a fifth example if the wireless device 10 may be configured with multiple serving cells, e.g. CA, Dual Connectivity (DC) etc., then the radio network node 12 may configure the wireless device 10 with two or more groups containing only serving carriers or with any combination of serving and non-serving carriers.

The information may comprise an indicator that the legacy measurement procedure is adapted according to the provided information. The signaled information may comprise list of groups wherein each group comprises groups of carriers. The groups may comprise carriers of different types depending on the aim. For example, in one case the aim could be to measure on as many carriers as possible and in this case there will be groups each comprising many carriers. The signaled information may also comprise rules indicating an order in which the wireless device 10 is to perform the measurement on carriers of different groups. The rule may indicate for example which group is measured first, and which group is measured second and so on.

The information about the determined carrier groups and other associated or additional information such as pre-start period, DRX cycle(s), scaling factor(s) etc. can be signaled in a broadcast message to plurality of wireless devices in a cell and/or in a wireless device specific message, e.g. dedicated message, to each wireless device individually. The former is used for the wireless devices in idle state whereas the latter for the wireless devices in connected state. In a typical exemplary implementation the radio network node 12 may decide to signal different sets of information for the wireless devices in idle state and wireless devices in connected state. In this case the radio network node 12 may determine, individually for each wireless device e.g. the wireless device 10, the group of carriers which are best suited for the wireless device 10 being in connected state according to capabilities of the wireless device 10 e.g. supported bands, RATs etc. In yet another example to simplify network implementation, the radio network node 12 may decide to signal the same sets of information for the wireless devices in idle state and wireless devices in connected state. In this case the radio network node 12 may determine the group of carriers on which all or most of the wireless devices can perform measurements.

Prior to configuring the wireless device 10 with one or more set of the above information, the radio network node 12 may determine the information based on one or more of the following criteria or pre-defined knowledge:

Frequency bands used in a coverage area where the wireless device 10 may operate while in Out of Network Coverage (ONC);

Carrier frequencies within the identified bands used in a coverage area where the wireless device 10 may operate while in ONC;

RATs, e.g. LTE TDD, LTE FDD, UMTS, GSM etc., within the identified bands used in a coverage area where the wireless device 10 may operate while in ONC;

Capability of the wireless device 10 in terms of supported bands;

Capability of the wireless device 10 in terms of supported RATs on different bands supported by the wireless device 10.

For example the radio network node 12 may configure the wireless device 10 with only those bands and RATs for measurement in the first and the second phases, which are available in the coverage area as well supported by the wireless device 10.

The radio network node 12 may acquire/obtain information about the capability of the wireless device 10 in terms of supported bands, RATs etc. based on indication received from the wireless device 10.

Method of Signaling Information about Group of Carriers to Other Network Nodes

This embodiment is related to the radio network node 12 transmitting or signaling information related to carrier groups to other network nodes, e.g. a second radio access node or similar, see action 412 above. Examples of other network nodes which receive the information are neighbour network nodes, core network nodes, positioning node, any type of relay node, or any other node used for dedicated services such as self-organizing network (SON) node. The information on the groups of carriers may be signaled by the radio network node 12 to the wireless devices which are configured with eDRX in the cells served by that radio network node 12. There are significant benefits in sharing carrier group information with other network nodes. One benefit is that this information may be applicable to wireless devices in its neighbour network nodes, and in that case it can be reused directly by signaling the grouping information to their own served wireless devices. This way, the measurements are improved in large scale.

A second benefit is that the carrier group information which can be quite complex sometimes, can be done in one place and only once, and then signaled to other network nodes in the wireless communication network 1. This way, processing in the radio network node 12 can be reduced.

A third benefit in sharing the carrier group information can be that the pre-start duration X may be coordinated among different network nodes. By coordinating the pre-start durations for wireless devices in different cells consistent wireless device measurement performance, e.g. measurement period, measurement reporting delay etc., can be achieved in different cells. A target network node, i.e. one receiving the information, may also determine the pre-start duration by using the statistics of pre-start duration received from plurality of network nodes.

The signaling of carrier group information may be done in a periodic, event-triggered or event-triggered periodic basis; event-triggered means that it is signaled whenever the grouping is performed or changed.

The method actions performed by the wireless device 10, such as a M2M device, according to some embodiments will now be described with reference to a flowchart depicted in FIG. 6. Embodiments herein disclose a method in the wireless device 10 being configured with a DRX cycle or a length of DRX cycle above a threshold, for obtaining, acquiring, or determining information related to the carrier groups for measurements under eDRX based on e.g. one or more pre-defined rules and/or from the network node. The wireless device 10 may use the obtained carrier group information to perform one or more measurements.

The information received from the radio network node 12 and being related to the groups of carriers as described in preceding sections comprises of at least two groups with at least one carrier per group. The group of carriers may comprise information on intra-frequency, inter-frequency and inter-RAT carriers. The carriers in each group may belong to the same type of RAT or any combination of RAT. The information related to the carrier groups may also comprise additional information such as the pre-start duration, an order in which carrier groups are to be measured, the scaling factor K to scale measurement performance of measurements done in different group of carriers, the DRX cycle, a DRX threshold etc.

Method in the Wireless Device 10 of Obtaining Carrier Group Information

Figure 6:
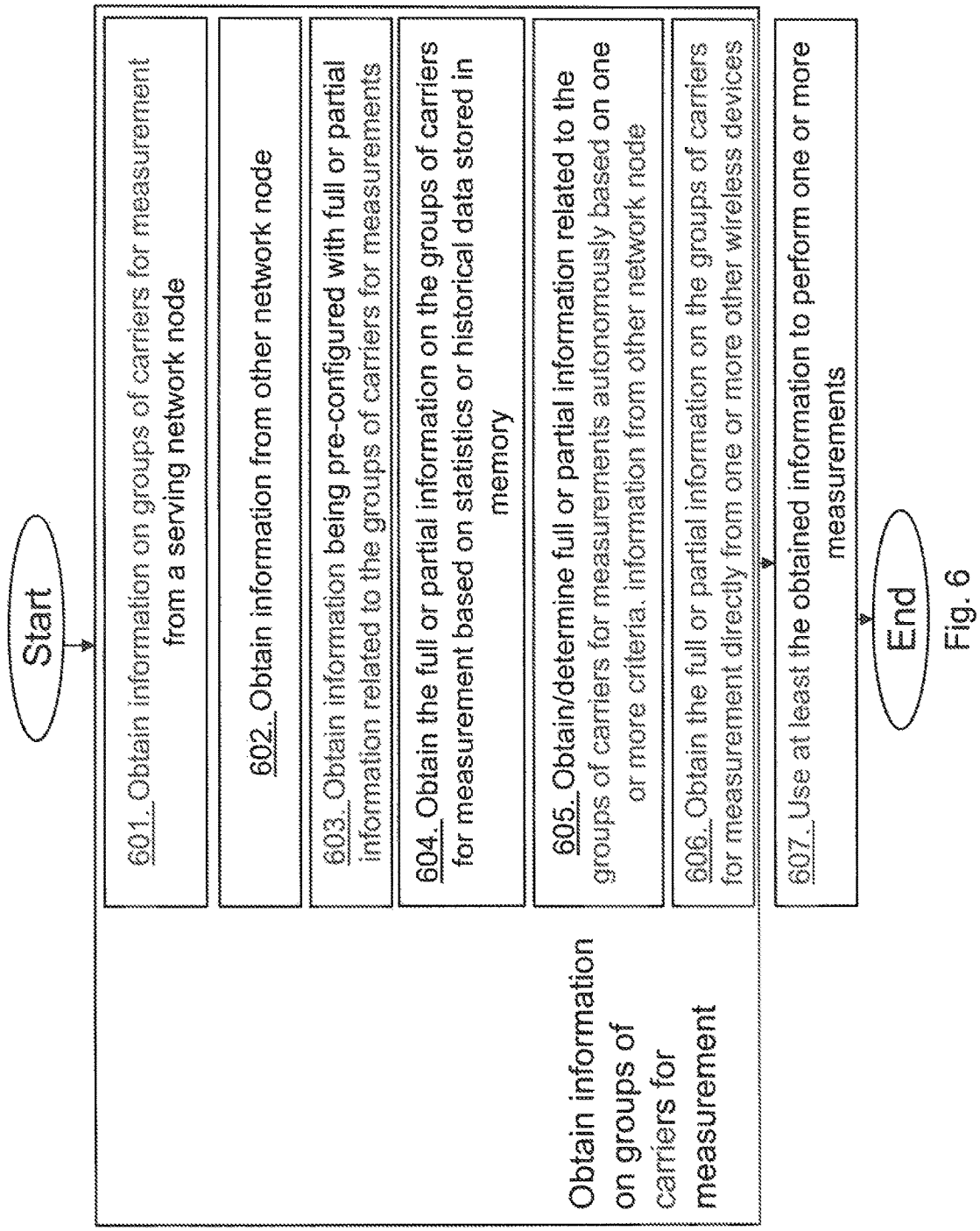
FIG. 6 shows a flowchart depicting a method performed by a wireless device according to some embodiments herein.

Non-limiting examples of methods which can be implemented in the wireless device 10 for obtaining information, as described above, related to two or more carrier groups for performing radio measurements on are described in reference to actions 601-606 in FIG. 6:

Action 601.

The wireless device 10 may obtain the information on the groups of carriers for measurement from a serving network node e.g. from the radio network node 12 serving any of the serving cells such as PCell, SCell, PSCell etc.

Action 602.

The wireless device 10 may also obtain the information on the groups of carriers for measurement from other network nodes, such as neighbor network nodes, core-network node, or other type of dedicated or non-dedicated nodes. For example in this case the wireless device 10 may read the system information sent on a broadcast channel by the radio network node 12 or another network node.

Action 603.

The wireless device 10 may also be pre-configured with full or partial information related to the groups of carriers for measurements. In case of pre-configuration of the partial information some parameters may be pre-configured while the remaining parameters may be received from the radio network node 12. The wireless device 10 may be pre-configured with one or more parameters related to the groups of carriers in one or more of the following means:
  pre-configured by a last serving cell, e.g. PCell, using signaling;
  pre-configured by an operator e.g. information stored in the SIM-card, information acquired from an application program etc. The wireless device 10 may retrieve the information when reading information on the SIM card and/or from the application program.
  pre-defined in the specification/standard. For example number of groups, pre-start duration etc may be pre-defined.

Action 604.

The wireless device 10 may also obtain the full or partial information on the groups of carriers for measurement based on statistics or historical data stored in the memory of the wireless device 10 e.g. by retrieving from its memory the values of the parameters related to the carrier groups used by the wireless device 10 most frequently in the past e.g. certain number of times in the past, over a certain time period in the past etc.

Action 605.

The wireless device 10 may determine full or partial information related to the groups of carriers for measurements autonomously based on one or more criteria. The wireless device 10 may also be configured by the radio network node 12 with one or more pre-defined criteria to be used by the wireless device 10 for autonomous determining the carrier groups. Examples of the criteria may be the same as used by the radio network node 12 for determining the information i.e. criteria described above. For example the radio network node 12 may configure the wireless device 10 with the DRX cycle and two or more group of carriers. The wireless device 10 autonomously based on one or more criteria may determine the groups and one or more additional parameters such as pre-start duration etc.

Action 606.

The wireless device 10 may also obtain the full or partial information on the groups of carriers for measurement directly from one or more other wireless devices if e.g. the wireless devices are capable of device to device (D2D) operation. D2D operation is also interchangeably called as D2D transmission and/or reception, ProSe operation, ProSe discovery, ProSe communication etc.

Action 607.

The wireless device 10 upon obtaining said information uses at least the obtained information to perform one or more measurements on one or more cells on the carriers belonging to the determined carrier groups based on the length of the DRX cycle configured for the wireless device 10.

The measurements are done by the wireless device 10 using a new measurement procedure aka adapted measurement procedure as described above. The wireless device 10 after performing the measurements use the measurement results for one or more tasks or operations. Examples of such tasks are:
  Performing cell change e.g. cell selection, cell reselection etc;
  Transmitting the measurement results to the radio network node 12;
  Using the measurement results for determining its position.

Method in the Wireless Device 10 for Adapting Measurement Procedure Under eDRX

In order to perform measurements on cells of carriers belonging to the determined carrier groups the wireless device 10 has to adapt one or more measurement procedures when operating in eDRX i.e. when the DRX cycle is longer than the DRX threshold. The wireless device 10 may, based on the length of the DRX cycle, also determine which sets of carrier groups, or groups, are to be used for performing measurements in case the wireless device 10 determines that each of two or more sets of carrier groups is associated with DRX cycle and/or with DRX cycle threshold.

The adaptation of the measurement procedure may be realized by the wireless device 10 based on one or more of:
  One or more pre-defined rules e.g. rules specified in the standard;
  Wireless device implementation specific i.e. purely decided by the wireless device itself.

One important aim of the adaptation of the measurement procedure is to comply and meet one or more pre-defined wireless device requirements related to wireless device measurements aka measurement requirements, Radio Resource Management (RRM) requirements, mobility requirements, positioning measurement requirements etc. Examples of wireless device requirements related to wireless device measurements are measurement time, measurement reporting time or delay, measurement accuracy, e.g. RSRP/RSRQ accuracy, number of cells to be measured over the measurement time etc. Examples of measurement time are Layer one (L1) measurement period, cell identification time or cell search delay, CGI acquisition delay etc.

The wireless device 10 may have to further adapt one or more measurement procedures to scale one or more measurement requirements of measurements performed on cells of different carrier groups as a function of one or more parameters associated with the obtained information related to the carrier groups. The term scaling herein may imply that a measurement requirement is defined as a function of one or more parameters associated with the information related to the carrier groups. An example of requirement that can be scaled is any type of measurement time such as L1 period, cell search delay etc. Typically the scaling can be done by using the scaling factor K. However the measurement requirements may further be scaled by other parameters such as number of carrier groups, number of carriers per group, pre-start duration, DRX cycle length etc. For example assume that the measurement period for measuring cells on one carrier is 1000 ms. Further assume that the wireless device is configured with 4 carrier groups (Lg), 2 carriers per group (Lc), with scaling factor of K=¼ per carrier group and DRX cycle of 50 seconds. In this example the wireless device will adapt its measurement procedure such that on the average the measurement on cells all carriers are measured within a period of Lg*Lc*1/K*1000*DRX cycle length (=4*2*4*1*50=1600 seconds).

As disclosed in the preceding sections that the wireless device 10 may obtain the information about the groups of carriers based one any combination of:
Autonomously;
based on received configuration from the radio network node 12 and/or other wireless devices; and
one or more predefined or preconfigured rules.
The wireless device 10 may perform the following:
The wireless device 10 obtains information defining at least two group of carriers, wherein each group comprising of at least one carrier, and wherein one or more cells/signals on each carrier within the same carrier group are to be measured by the wireless device 10 during the same DRX cycle period, e.g. ON duration period, when DRX cycle length is above a threshold;
The wireless device may obtain information on how to perform the measurements using the groups of carriers; this may e.g. include in which order the groups are measured, priorities of different groups etc.
The wireless device may further obtain information about the pre-start duration X allowing the wireless device 10 to wake up earlier prior to the ON duration of the DRX cycle to perform measurements, or alternatively stay awake after the ON duration to perform measurements and potentially reselect ready for the next ON duration.
If the length of the at least one DRX cycle being currently used by the wireless device 10 is determined to be above the threshold then performing one or more measurements on one or more cells/signals on each carrier within the same group of carriers during the same length of the DRX cycle.
The wireless device 10 may also send information about pre-defined or configurable rule to other network nodes and other wireless devices, which e.g. are D2D capable, in its proximity.

The wireless device 10 under eDRX may use the information related to at least one DRX cycle to be used by the wireless device 10 to compare it to a fixed or configurable threshold which is predefined. In case it is assessed that the configured length of the DRX cycle of the wireless device 10 is greater than the threshold, the wireless device 10 may use the obtained information on groups of carriers to adapt its measurement procedure.

Adapting of measurement procedure may comprise several actions. As part of the adapting procedure, the wireless device 10 may use information on pre-start duration length, T1 ms, provided that the wireless device 10 is pre-defined or configured with such information to configure the wireless device 10 to wake up T1 ms before the ON-duration of the DRX cycle to perform measurements. This is illustrated in FIG. 5 above.

The pre-start duration length or period length, which is pre-defined or signaled, may depend on several factors as follows:
size of group of carriers;
length of the DRX cycle;
number of cells to measure;
type of measurements;
type of carriers, intra-, inter-, inter-RAT;

As an example, if the number of cells the wireless device 10 is required to measure in a group of carriers is ten, then the wireless device 10 may wake up T1 ms prior to the ON duration period to perform measurements where T1 is 800 ms. However, if the number of cells the wireless device 10 is required to measure in the said carrier group is four, then the pre-start duration T1 may be smaller, e.g. 400 ms. The reason is that time to perform measurement increases as function of the number of cells to perform measurements on.

In another example the pre-start duration length for said wireless device 10 may be set to T1, where T1 is 800 ms, when the configured eDRX length is 30 minutes. However, the same wireless device 10 may be predefined with a pre-start duration length of T2, where T2 is 400 ms, when it is configured with eDRX length of 5 minutes. The reason is that the wireless device 10 is inactive for longer time when the configured eDRX length is long, i.e. when configured with smaller eDRX length wireless device 10 wakes up more frequently to receive PDCCH. It is highly likely that a wireless device which wakes up frequently to receive PDCCH is in sync to the network more than a wireless device which is active most of the time. Thus the pre-start duration length may increase with eDRX length.

In another example, there are 2 frequencies in each carrier group and the wireless device 10 is required to measure up to 4 cells on each frequency. When the wireless device 10 wakes up at the beginning of the pre-start duration, the wireless device 10 makes a measurement of cells on a first frequency, then makes a measurement of cells on a second frequency, then the wireless device 10 makes further measurement of cells on the first frequency, then the wireless device 10 makes further measurement of cells on the second frequency; the measurement samples are spaced in time in a manner which allows averaging or filtering to better mitigate the effects of fast fading of the radio channel compared to measurement samples which are more closely spaced in time. On a subsequent wake up, a similar operation would be performed in the pre start period for a different carrier group.

The length of pre-start duration may also depend on type of measurements the wireless device 10 performs. Typically the wireless device 10 may be able to perform downlink cell measurements such as RSRP/RSRQ within 200 ms while cell search measurements such as PSS/SSS acquisition may take longer time, 600 ms in typical cases. Thus it may be beneficial to take into account type of measurement the wireless device 10 intends to perform when deciding the length of pre-start duration.

Type of carriers is another factor that may be beneficial to take into account when deciding the length of pre-start duration. The wireless device 10 may be able to measure on intra-frequency carriers without causing any interruption on the connect PCell. But the wireless device 10 may need to create measurement gaps to perform measurements on inter-frequency and inter-RAT carriers. The pre-start duration length may be longer when performing measurements on these carriers.

The wireless device 10 may also take into account the scaling factor (K) associated with the group of carriers when doing the measurement. For example based on the obtained values of K the wireless device 10 may determine how often and/or the measurement time over which the wireless device 10 should perform measurement on carriers of a particular group of carriers. For example if K is to be equally divided between groups of carriers then the wireless device 10 may measure on different groups of carriers over same or similar measurement time assuming the radio conditions are similar. In order to achieve this objective the wireless device 10 has to plan such measurements ahead in time e.g. one or two DRX cycles before doing actual measurements.

Figure 7:
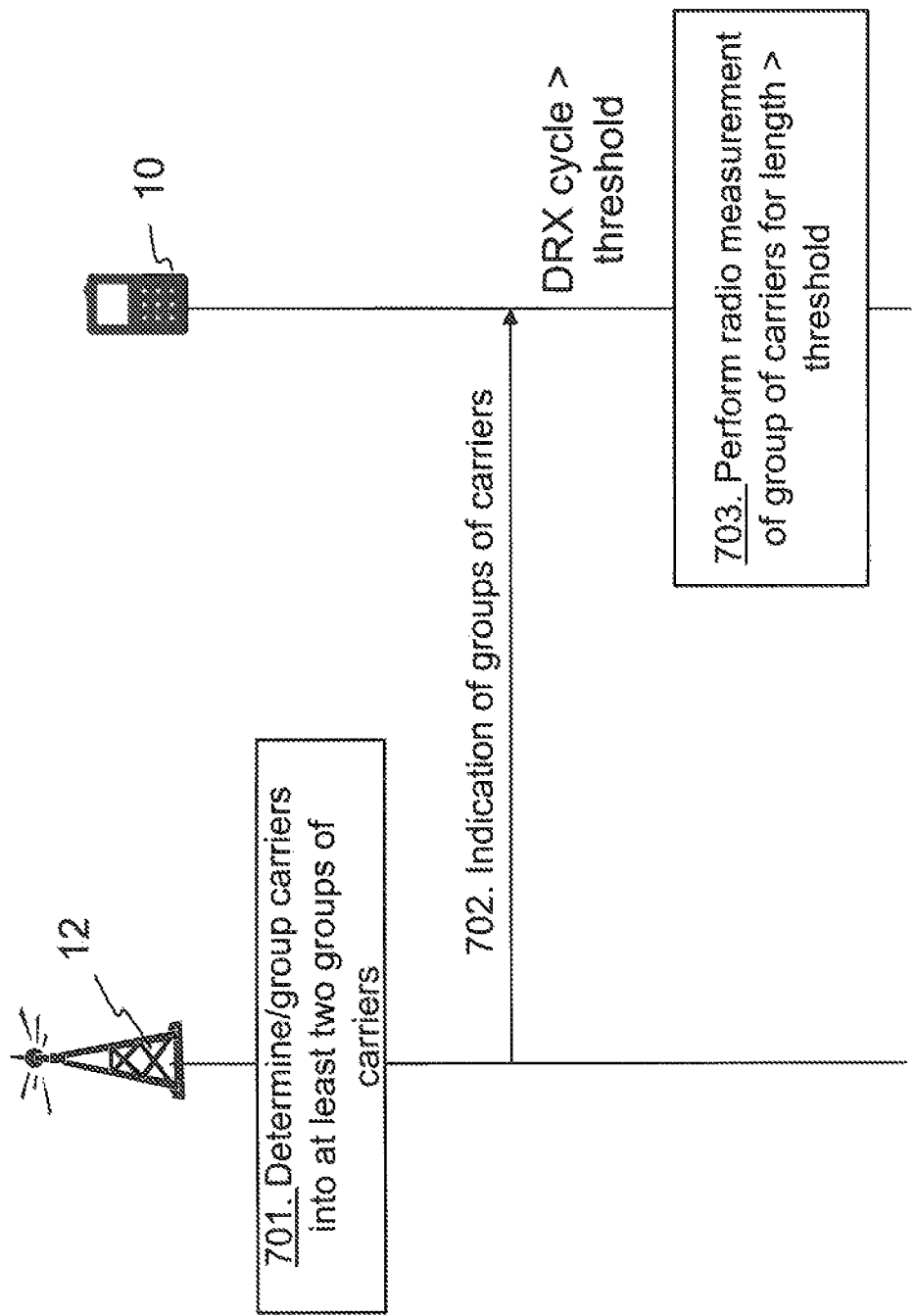
FIG. 7 shows a combined signaling scheme and flowchart according to some embodiments herein.

FIG. 7 shows a combined flowchart and signaling scheme according to some embodiments herein.

Action 701.

The radio network node 12 determines or groups at least two groups of carriers, the first and the second group. At least one of the groups of carriers comprises one carrier to perform radio measurements on by the wireless device 10 when the wireless device 10 is configured with the DRX period or cycle above the threshold.

Action 702.

The radio network node 12 then transmits information/message comprising indication of the at least one of the groups of carriers informing the wireless device 10 which carrier or carriers to perform radio measurements on when the wireless device 10 is configured with the DRX cycle above the threshold.

Action 703.

The wireless device 10 may compare its length of a presently configured DRX cycle with the threshold, and when the length is longer than the threshold the wireless device 10 performs the radio measurement on the one carrier of the at least one group of carriers.

Thus, the radio network node 12 configures the wireless device 10 under DRX cycle of a length defined by a threshold, with groups of carriers than the wireless device 10 can measure on using e.g. predefined rules. The grouping of available carriers can be done differently depending upon scenarios in which the wireless device 10 operates. The grouping enables the measurement procedure feasible for the wireless device 10 under eDRX wherein the DRX cycles can be very long. The predefined rule may indicate how the measurements are carried out. One example of such rule is that the wireless device 10 performs measurements on carriers in group 1 on odd DRX cycles and on carriers in group 2 in even DRX cycles etc. The radio network node 12 can configure different rules depending on the scenarios.

The radio network node 12 may also configure the wireless device 10 with pre-start duration which allows the wireless device 10 to wake up prior to the start of the ON duration to perform measurements. The idea of pre-start duration is to allow time for the wireless device 10 to measure on configured carriers prior to ON-duration in order to take necessary actions, e.g. cell re-selection, handover, RRC re-establishment etc., during the ON-duration.

From the wireless device 10 perspective, the proposed solution allows the wireless device 10 under eDRX to obtain information related to carrier groups, measurement procedure rule, pre-start duration and then using them to adapt its measurement procedure, and especially to reduce measurement activity and hence power consumption. The wireless device 10 may also send the said obtained information to other network nodes and wireless devices in its close proximity.

Figure 8:
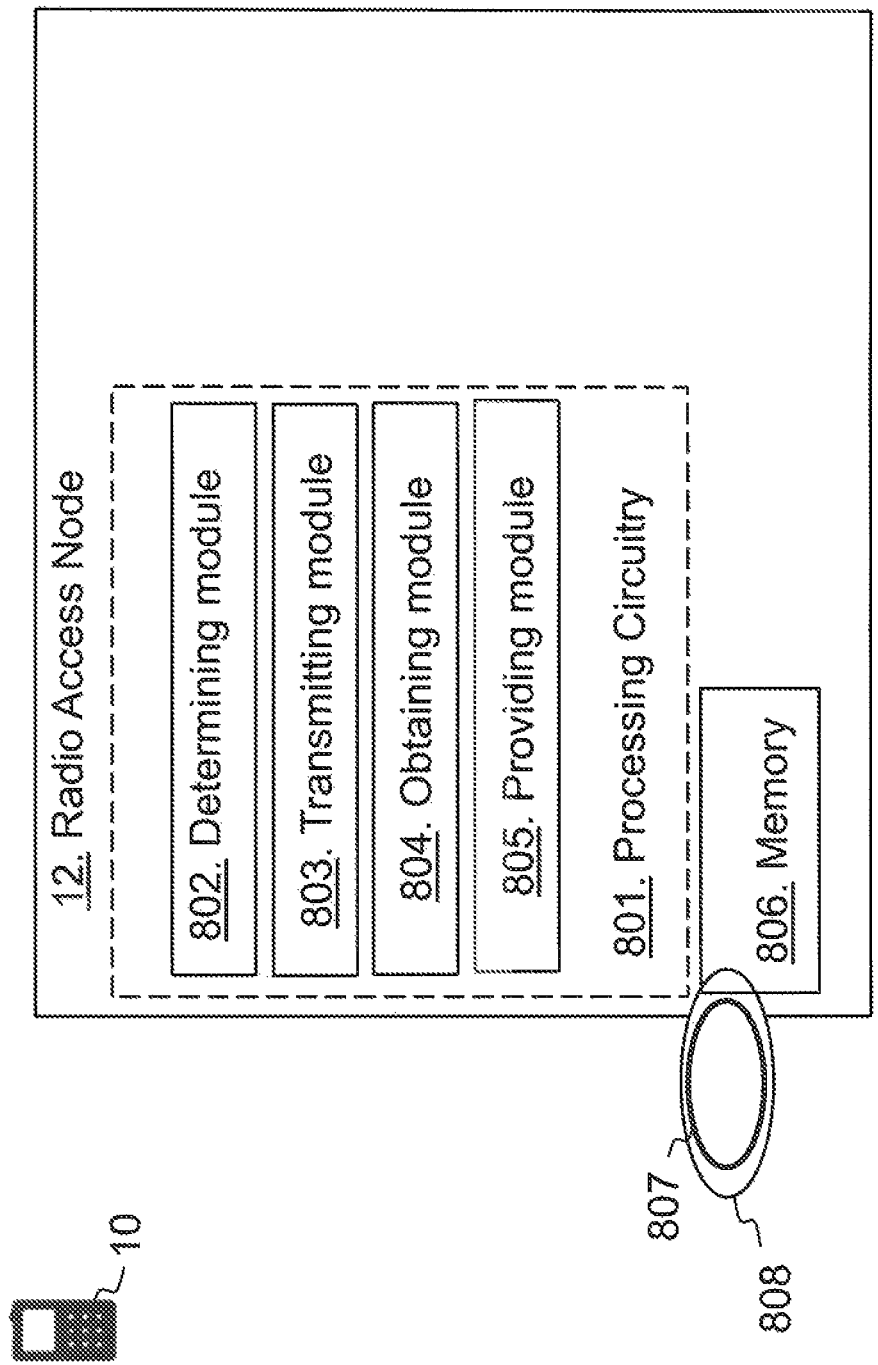
FIG. 8 shows a radio network node according to embodiments herein.

FIG. 8 is a block diagram depicting the radio network node 12 according to embodiments herein for configuring the wireless device 10, being served by the radio network node 12, for performing radio measurements.

The radio network node 12 may comprise processing circuitry 801, e.g. one or more processors, configured to perform the methods herein.

The radio network node 12 may comprise a determining module 802. The radio network node 12, the processing circuitry 801, and/or the determining module 802 may be configured to determine at least two groups, the first and the second group, of carriers out of the number of carriers, wherein the first group comprises at least one carrier to perform radio measurements on by the wireless device when the wireless device is configured with a DRX cycle above the threshold.

The radio network node 12 may comprise a transmitting module 803. The radio network node 12, the processing circuitry 801, and/or the transmitting module 803 may be configured to transmit the message comprising the indication of the at least one carrier of the first group and informing the wireless device which carrier or carriers to perform radio measurements on when the wireless device 10 is configured with the DRX cycle above the threshold. The indication may be an identifier of the first group, e.g. group ID, or an identifier of the at least one carrier, e.g. carrier ID. The message may comprise data indicating the at least one carrier of the first group to perform radio measurement on when the DRX cycle is above the threshold and data indicating at least one second carrier of the second group to perform radio measurement on when the DRX cycle is equal to or below the threshold, e.g. when the first group is for MTC devices and the second group is four non MTC devices. The message may comprise data indicating the at least one carrier of the first group to perform radio measurement on within the same DRX cycle when the DRX cycle is above the threshold and data indicating at least one second carrier of the second group to perform radio measurement on within the same DRX cycle but at different time when the DRX cycle is above the threshold. The indication may be configuring information indicating one or more carriers comprising the at least one carrier in the first group to perform radio measurements on in odd DRX cycles and one or more carriers in the second group to perform radio measurements on in even DRX cycles, hence, all carriers may be used for measurements but measured every second DRX cycle. The radio network node 12, the processing circuitry 801, and/or the transmitting module 803 may be configured to transmit the start indication of the pre-start duration, which start indication allows the wireless device 10 to wake up prior to the start of the ON duration interval to perform radio measurements. The radio network node 12, the processing circuitry 801, and/or the transmitting module 803 may be configured to transmit the scaling factor indicating a fraction of the total available measurement time to use for one or more of the at least two groups.

The radio network node 12 may comprise an obtaining module 804. The radio network node 12, the processing circuitry 801, and/or the obtaining module 804 may be configured to obtain information whether the wireless device 10 is configured or expected to be configured with the DRX cycle above the threshold. The radio network node 12, the processing circuitry 801, and/or the determining module 802 may then be configured to take the obtained information into account when determining the groups.

The radio network node 12, the processing circuitry 801, and/or the determining module 802 may be configured to take one or more of the following into account when determining the groups:

Received group information from a neighbouring radio network node, which group information indicates groups of carriers created at the neighbouring radio network node;

Received group information from the wireless device 10, which group information indicates groups of carriers recommended by the wireless device;

Measurement performance of one or more wireless device measurements on one or more carrier frequencies to be achieved;

Frequency bands used in a coverage area where the wireless device 10 operates while in Out of Network Coverage;

Carrier frequencies within identified bands used in a coverage area where the wireless device 10 operates while in Out of Network Coverage;

Radio Access technologies within identified bands used in a coverage area where the wireless device 10 operates while in Out of Network Coverage;

Capability of the wireless device 10 in terms of supported bands; and

Capability of the wireless device 10 in terms of supported Radio Access technologies on different bands supported by the wireless device 10.

The radio network node 12 may comprise a providing module 805. The radio network node 12, the processing circuitry 801, and/or the providing module 805 may be configured to provide group information to a neighbouring radio network node, which group information indicates the determined groups.

Thus, the radio network node 12 may be configured to determine/group at least two groups of carriers, a first and a second group. E.g. the radio network node may be configured to divide a number of carriers into two or more groups of carriers, the first group comprises at least one different carrier than the second group. At least one of the groups of carriers comprises one carrier to perform radio measurements on by the wireless device when the wireless device being configured with a Discontinuous Reception period or cycle above a threshold. The radio network node 12 may further be configured to transmit information/message comprising indication of the at least one of the groups of carriers informing the wireless device 10 which carrier or carriers to perform radio measurements on when the wireless device 10 is configured with the DRX cycle above the threshold.

The radio network node 12 may be configured to obtain information whether the wireless device 10 is configured or expected to be configured with the DRX cycle above the threshold. The radio network node 12 may e.g. transmit data indicating a first group carriers to perform radio measurement on when the DRX cycle is above 10 seconds and transmit data indicating a second group of carriers to perform radio measurement on when the DRX cycle is equal to or below 10 seconds. Alternatively, the radio network node 12 may be configured to transmit indication of carriers of the first and second groups and a selection process of selecting group is performed in the wireless device 10 based on the DRX cycle configured at the wireless device 10.

The processing circuitry 801 and/or the determining module 802 may be configured to determine/group at least two groups of carriers, the first and the second group. The first group may comprise at least one different carrier than the second group. At least one of the groups of carriers comprises one carrier to perform radio measurements on by the wireless device when the wireless device being configured with the DRX period or cycle above the threshold.

The processing circuitry 801 and/or the transmitting module 803 may be configured to transmit information/message comprising indication of the at least one of the groups of carriers informing the wireless device which carrier or carriers to perform radio measurements on when the wireless device is configured with the DRX cycle above the threshold.

The radio network node 12 further comprises a memory 806. The memory 806 comprises one or more units to be used to store data on, such as DRX cycles information, thresholds, measurements, groups of carriers, applications to perform the methods disclosed herein when being executed, and similar.

The methods according to the embodiments described herein for the radio network node 12 may respectively be implemented by means of e.g. a computer program 807 or a computer program product, comprising instructions, i.e., software code portions, which, when executed on at least one processor, cause the at least one processor to carry out the actions described herein, as performed by the radio network node 12. The computer program 807 may be stored on a computer-readable storage medium 808, e.g. a disc or similar. The computer-readable storage medium 808, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

Figure 9:
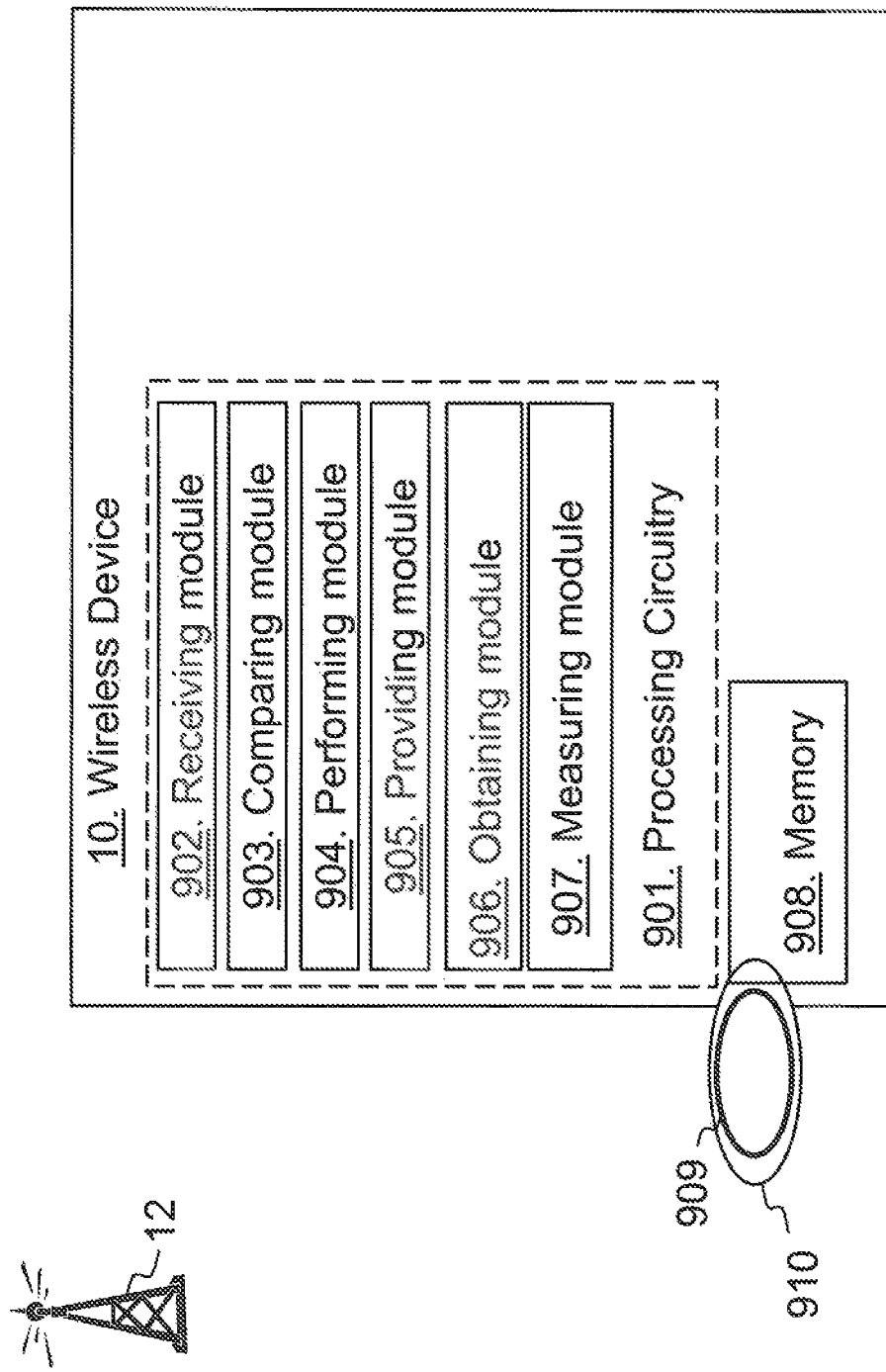
FIG. 9 shows a wireless device according to embodiments herein.

FIG. 9 is a block diagram depicting the wireless device 10 according to embodiments herein for performing a radio measurement on at least one carrier, wherein the wireless device 10 is configured with the DRX cycle, may be configured with one or more DRX cycles.

The wireless device 10 may comprise processing circuitry 901 configured to perform the methods herein.

The wireless device 10 may comprise a receiving module 902. The wireless device 10, the processing circuitry 901 and/or the receiving module 902 may be configured to receive the message comprising the indication indicating the at least one carrier of the first group out of the at least two groups to perform radio measurement on when the DRX cycle is above the threshold, and the second indication indicating at least one second carrier of the second group to perform radio measurement on when the DRX cycle is equal to or below the threshold or when the DRX cycle is above the threshold but at a different time. The indication may be the identifier of the first group or the identifier of the at least one carrier, and/or the second indication is the second identifier of the second group or the second identifier of the at least one second carrier. The wireless device 10, the processing circuitry 901 and/or the receiving module 902 may be configured to receive configuring information indicating the at least one carrier of the first group to perform radio measurement on within the same DRX cycle when the DRX cycle is above the threshold and data indicating at least one second carrier of the second group to perform radio measurement on within the same DRX cycle but at different time when the DRX cycle is above the threshold. The received indication may be configuring information indicating one or more carriers comprising the at least one carrier in the first group to perform radio measurements on in odd DRX cycles and one or more second carriers comprising the at least one second carrier in the second group to perform radio measurements on in even DRX cycles.

The wireless device 10 may comprise a comparing module 903. The wireless device 10, the processing circuitry 901 and/or the comparing module 903 may be configured to compare the length of the configured DRX cycle with the threshold.

The wireless device 10 may comprise a performing module 904. The wireless device 10, the processing circuitry 901 and/or the performing module 904 may be configured to perform, when the length is above the threshold, the radio measurement on the at least one carrier of the first group. The wireless device 10, the processing circuitry 901 and/or the performing module 904 may be configured to perform, when the length is above the threshold, the radio measurement on the one or more carriers of the first group in odd DRX cycles and on the one or more second carriers of the second group in even DRX cycles.

The wireless device 10, the processing circuitry 901 and/or the receiving module 902 may be configured to receive the scaling factor indicating the fraction of the total available measurement time to use for one or more of the at least two groups, and the wireless device 10, the processing circuitry 901 and/or the performing module 904 may be configured to take the scaling factor into account when performing the radio measurement.

The wireless device 10 may comprise a providing module 905. The wireless device 10, the processing circuitry 901 and/or the providing module 902 may be configured to provide information to the radio network node 12, which information is whether the wireless device 10 is configured or expected to be configured with the DRX cycle above the threshold.

The wireless device 10, the processing circuitry 901 and/or the receiving module 902 may be configured to receive the start indication of the pre-start duration, and further configured to wake up prior to the start of the ON duration interval based on the received indication of the pre-start duration.

The wireless device 10 may comprise an obtaining module 906. The wireless device 10, the processing circuitry 901 and/or the obtaining module 906 may be configured to obtain group information indicating one or more carriers comprising the at least one carrier in the first group to perform radio measurements on, and one or more second carriers comprising the at least one second carrier in the second group to perform radio measurements on. The wireless device 10, the processing circuitry 901 and/or the obtaining module 906 may be configured to obtain the group information by determining the group information based on one or more of the following:

Frequency bands used in a coverage area where the wireless device 10 operates while in Out of Network Coverage;
Carrier frequencies within identified bands used in a coverage area where the wireless device operates while in Out of Network Coverage;
Radio Access technologies within identified bands used in a coverage area where the wireless device operates while in Out of Network Coverage;
Capability of the wireless device in terms of supported bands;
Capability of the wireless device 10 in terms of supported Radio Access technologies on different bands supported by the wireless device 10;
Measurement performance of one or more wireless device measurements on one or more carrier frequencies to be achieved; and The wireless device 10 may transmit the determined group information to the radio network node 12.

Thus, the wireless device 10 may be configured to obtain information indicating at least two groups of carriers, a first and a second group. At least one of the groups of carriers comprises one carrier to perform radio measurements on by the wireless device when the wireless device being configured with a DRX period or cycle above a threshold. The wireless device 10 is further configured to, when the length of presently configured DRX cycles is above the threshold, perform the radio measurement on the one carrier of the at least one group of carriers.

The processing circuitry 901 and/or the obtaining module 906 may be configured to obtain information indicating at least two groups of carriers, a first and a second group. At least one of the groups of carriers comprises one carrier to perform radio measurements on by the wireless device when the wireless device being configured with a Discontinuous Reception period or cycle above a threshold.

The wireless device 10 may comprise a measuring module 907. The processing circuitry 901 and/or the measuring module 907 may be configured to, when the length of presently configured DRX cycles is above the threshold, perform the radio measurement on the one carrier of the at least one group of carriers.

The wireless device 10 further comprises a memory 908. The memory 908 comprises one or more units to be used to store data on, such as DRX cycles information, thresholds, measurements, groups of carriers, applications to perform the methods disclosed herein when being executed, and similar.

The methods according to the embodiments described herein for the wireless device 10 may respectively be implemented by means of e.g. a computer program 909 or a computer program product, comprising instructions, i.e., software code portions, which, when executed on at least one processor, cause the at least one processor to carry out the actions described herein, as performed by the wireless device 10. The computer program 909 may be stored on a computer-readable storage medium 910, e.g. a disc or similar. The computer-readable storage medium 910, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The object may be achieved by providing a method performed by a radio network node for configuring a wireless device being served or controlled by the radio network node for performing radio measurements. The radio network node determines/groups at least two groups of carriers, a first and a second group. E.g. the radio network node may divide a number of carriers into two or more groups of carriers, the first group comprises at least one different carrier than the second group. At least one of the groups of carriers comprises one carrier to perform radio measurements on by the wireless device when the wireless device being configured with a Discontinuous Reception period or cycle above a threshold. The radio network node then transmits information/message comprising indication of the at least one of the groups of carriers informing the wireless device which carrier or carriers to perform radio measurements on when the wireless device is configured with the DRX cycle above the threshold.

The radio network node may obtain information whether the wireless device is configured or expected to be configured with the DRX cycle above the threshold. The radio network node may e.g. transmit data indicating a first group carriers to perform radio measurement on when the DRX cycle is above e.g. 10 seconds and transmit data indicating a second group of carriers to perform radio measurement on when the DRX cycle is equal to or below 10 seconds. Alternatively, the radio network node may transmit indication of carriers of the first and second groups and a selection process of selecting group is performed in the wireless device based on the DRX cycle configured at the wireless device.

The object may be achieved by providing a method performed by a wireless device for performing a radio measurement wherein the wireless device is being served or controlled by a radio network node. The wireless device obtains information indicating at least two groups of carriers, a first and a second group. At least one of the groups of carriers comprises one carrier to perform radio measurements on by the wireless device when the wireless device being configured with a Discontinuous Reception period or cycle above a threshold. The wireless device may compare length of a presently configured DRX cycle for the wireless device with the threshold. When the length is above the threshold the wireless device performs the radio measurement on the one carrier of the at least one group of carriers.

It will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/ or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatuses taught herein. As such, the inventive apparatuses and techniques taught herein are not limited by the foregoing description and accompanying drawings. Instead, the embodiments herein are limited only by the following claims and their legal equivalents.

| Abbreviation | Explanation |
| --- | --- |
| ACK | Acknowledged |
| ADC | Analog-to-digital conversion |
| AGC | Automatic gain control |
| ANR | Automatic neighbour relations |
| AP | Access point |
| BCH | Broadcast channel |
| BLER | Block error rate |
| BS | Base station |
| BSC | Base station controller |
| BTS | Base transceiver station |
| CA | Carrier aggregation |
| CC | Component carrier |
| CG | Cell group |
| CGI | Cell global identity |
| CP | Cyclic prefix |
| CPICH | Common pilot channel |
| CSG | Closed subscriber group |
| DAS | Distributed antenna system |
| DC | Dual connectivity |
| DFT | Discrete Fourier Transform |
| DL | Downlink |
| DL-SCH | Downlink shared channel |
| DRX | Discontinuous reception |
| EARFCN | Evolved absolute radio frequency channel number |
| ECGI | Evolved CGI |
| eNB | eNodeB |
| FDD | Frequency division duplex |
| FFT | Fast Fourier transform |
| HD-FDD | Half duplex FDD |
| HO | Handover |
| M2M | machine to machine |
| MAC | Media access control |
| MCG | Master cell group |
| MDT | Minimization of drive tests |
| MeNB | Master eNode B |
| MIB | Master information block |
| MME | Mobility management entity |
| MRTD | Maximum receive timing difference |
| MSR | Multi-standard radio |
| NACK | Not acknowledged |
| OFDM | Orthogonal frequency division multiplexing |
| SI | System Information |
| PCC | Primary component carrier |
| PCI | Physical cell identity |
| PCell | Primary Cell |
| PCG | Primary Cell Group |
| PCH | Paging channel |
| PDU | Protocol data unit |
| PGW | Packet gateway |
| PHICH | Physical HARQ indication channel |
| PLMN | Public land mobile network |
| PSCell | Primary SCell |
| PSC | Primary serving cell |
| PSS | Primary synchronization signal |
| RAT | Radio Access Technology |
| RF | Radio frequency |
| RLM | Radio link monitoring |
| RNC | Radio Network Controller |
| RRC | Radio resource control |
| RRH | Remote radio head |
| RRU | Remote radio unit |
| RSCP | Received signal code power |
| RSRP | Reference Signal Received Power |
| RSRQ | Reference Signal Received Quality |
| RSSI | Received signal strength indication |
| RSTD | Reference signal time difference |
| RV | Redundancy version |
| Rx | Receiver |
| SCC | Secondary component carrier |
| SCell | Secondary Cell |
| SCG | Secondary Cell Group |
| SeNB | Secondary eNode B |
| SFN | System frame number |
| SGW | Signaling gateway |
| SI | System information |
| SIB | System information block |
| SIB1 | System information block type 1 |
| SINR | Signal to interference and noise ratio |
| SON | Self-organizing networks |

-continued

| Abbreviation | Explanation |
|---|---|
| SSC | Secondary serving cell |
| SSS | Secondary synchronization signal |
| TA | Timing advance |
| TAG | Timing advance group |
| TDD | Time division duplex |
| Tx | Transmitter |
| UARFCN | UMTS Absolute Radio Frequency Channel Number |
| UE | User equipment |
| UL | Uplink |

The invention claimed is:

1. A method performed by a wireless device for performing a radio measurement on at least one carrier, wherein the wireless device is served by a radio network node and being configured with a Discontinuous Reception, DRX, cycle; the method comprising:
receiving a message comprising an indication indicating the at least one carrier of a first group out of at least two groups to perform radio measurement on when the DRX cycle is above a threshold and a second indication indicating at least one second carrier of a second group to perform radio measurement on when the DRX cycle is equal to or below the threshold or when the DRX cycle is above the threshold but at a different time;
comparing a length of the configured DRX cycle with the threshold; and
when the length is above the threshold, performing the radio measurement on the at least one carrier of the first group.

2. A method according to claim 1, wherein the indication is an identifier of the first group or an identifier of the at least one carrier, and/or the second indication is a second identifier of the second group or a second identifier of the at least one second carrier.

3. A method according to claim 1, wherein the receiving comprises receiving configuring information indicating one or more carriers comprising the at least one carrier in the first group to perform radio measurements on in odd DRX cycles and one or more second carriers comprising the at least one second carrier in the second group to perform radio measurements on in even DRX cycles, and when the length is above the threshold, performing the radio measurement on the one or more carriers of the first group in odd DRX cycles and on the one or more second carriers of the second group in even DRX cycles.

4. A method according to claim 1, wherein the receiving comprises receiving configuring information indicating the at least one carrier of the first group to perform radio measurement on within the same DRX cycle when the DRX cycle is above the threshold and data indicating at least one second carrier of the second group to perform radio measurement on within the same DRX cycle but at different time when the DRX cycle is above the threshold.

5. A method according to claim 1, wherein the receiving comprises receiving a scaling factor indicating a fraction of a total available measurement time to use for one or more of the at least two groups, and taking the scaling factor into account when performing the radio measurement.

6. A method according to claim 1, further comprising providing information to the radio network node, which information is whether the wireless device is configured or expected to be configured with the DRX cycle above the threshold.

7. A method according to claim 1 wherein the receiving comprises receiving a start indication of a pre-start duration, and the method further comprises
waking up prior to a start of an ON duration interval based on the received indication of a pre-start duration.

8. A method according to claim 1, further comprising
obtaining group information indicating one or more carriers comprising the at least one carrier in the first group to perform radio measurements on, and one or more second carriers comprising the at least one second carrier in the second group to perform radio measurements on.

9. A wireless device for performing a radio measurement on at least one carrier, wherein the wireless device is configured with a Discontinuous Reception, DRX, cycle; the wireless device further being configured to
receive a message comprising an indication indicating the at least one carrier of a first group out of at least two groups to perform radio measurement on when the DRX cycle is above a threshold and a second indication indicating at least one second carrier of a second group to perform radio measurement on when the DRX cycle is equal to or below the threshold or when the DRX cycle is above the threshold but at a different time;
compare a length of the configured DRX cycle with the threshold; and when the length is above the threshold being configured to
perform the radio measurement on the at least one carrier of the first group.

10. A wireless device according to claim 9, wherein the indication is an identifier of the first group or an identifier of the at least one carrier, and/or the second indication is a second identifier of the second group or a second identifier of the at least one second carrier.

11. A wireless device according to claim 9, wherein the received indication is configuring information indicating one or more carriers comprising the at least one carrier in the first group to perform radio measurements on in odd DRX cycles and one or more second carriers comprising the at least one second carrier in the second group to perform radio measurements on in even DRX cycles, and when the length is above the threshold, the wireless device is configured to perform the radio measurement on the one or more carriers of the first group in odd DRX cycles and on the one or more second carriers of the second group in even DRX cycles.

12. A wireless device according to claim 9, being configured to receive configuring information indicating the at least one carrier of the first group to perform radio measurement on within the same DRX cycle when the DRX cycle is above the threshold and data indicating at least one second carrier of the second group to perform radio measurement on within the same DRX cycle but at different time when the DRX cycle is above the threshold.

13. A wireless device according to claim 9, being configured to receive a scaling factor indicating a fraction of a total available measurement time to use for one or more of the at least two groups, and being configured to take the scaling factor into account when performing the radio measurement.

14. A wireless device according to claim 9, further being configured to provide information to the radio network node, which information is whether the wireless device is configured or expected to be configured with the DRX cycle above the threshold.

15. A wireless device according to claim 9, being configured to receive a start indication of a pre-start duration, and further configured to wake up prior to a start of an ON duration interval based on the received indication of a pre-start duration.

16. A wireless device according to claim 9, being configured to obtain group information indicating one or more carriers comprising the at least one carrier in the first group to perform radio measurements on, and one or more second carriers comprising the at least one second carrier in the second group to perform radio measurements on.

* * * * *